United States Patent
Tachibana

(10) Patent No.: US 11,984,025 B2
(45) Date of Patent: May 14, 2024

(54) CONTROL SYSTEM AND CONTROL METHOD OF VEHICLE GROUP

(71) Applicant: TOYOTA JIDOSHA KABUSHIKI KAISHA, Toyota (JP)

(72) Inventor: Akihide Tachibana, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 17/893,837

(22) Filed: Aug. 23, 2022

(65) Prior Publication Data
US 2023/0098342 A1    Mar. 30, 2023

(30) Foreign Application Priority Data
Sep. 24, 2021 (JP) .................... 2021-155926

(51) Int. Cl.
| | |
|---|---|
| *G08G 1/087* | (2006.01) |
| *B60W 30/18* | (2012.01) |
| *B60W 30/182* | (2020.01) |
| *G06V 20/58* | (2022.01) |

(52) U.S. Cl.
CPC ....... *G08G 1/087* (2013.01); *B60W 30/18154* (2013.01); *B60W 30/182* (2013.01); *G06V 20/584* (2022.01); *B60W 2510/0638* (2013.01)

(58) Field of Classification Search
CPC .................................................. G08G 1/087
See application file for complete search history.

(56) References Cited

U.S. PATENT DOCUMENTS

| | | | |
|---|---|---|---|
| 10,037,689 B2 * | 7/2018 | Taylor | G05D 1/0285 |
| 2018/0158329 A1 * | 6/2018 | Benhammou | G08G 1/07 |
| 2019/0005812 A1 * | 1/2019 | Matus | G06V 20/584 |
| 2019/0272748 A1 * | 9/2019 | Cross | G08G 1/056 |

FOREIGN PATENT DOCUMENTS

JP    2009-140327 A    6/2009

OTHER PUBLICATIONS

U.S. Appl. No. 17/949,397, filed Sep. 21, 2022 Inventors: Hiromitsu Urano et al.

* cited by examiner

*Primary Examiner* — Joseph H Feild
*Assistant Examiner* — Pameshanand Mahase
(74) *Attorney, Agent, or Firm* — Dinsmore & Shohl LLP

(57) ABSTRACT

A control device included in each vehicle composing a vehicle group predicts a vehicle state of a subject vehicle before a traveling regulation point based on speed information of the subject vehicle, light color information of a traffic signal, and distance information between the subject vehicle and an entrance of the traveling regulation point. Based on the vehicle state, it is determined whether a vehicle of which the vehicle state corresponds to an unenterable state is included in the vehicle group. The unenterable state indicates a state where the subject vehicle cannot enter the traveling regulation point before the traffic signal is changed to the yellow light when its speed is maintained at a current speed. When it is determined that the vehicle in the unenterable state is included in the vehicle group, the subject vehicle is controlled such that it does not enter the traveling regulation point.

9 Claims, 11 Drawing Sheets

DISTANCE BETWEEN VEHICLE POSITION TO
STOP LINE AT START TIMING OF YELLOW LIGHT

M1 TO M3: SUA

M1: SAB1 or SAB2
M3: SUA

CONTROL SYSTEM AND CONTROL METHOD OF VEHICLE GROUP

CROSS-REFERENCE TO RELATED APPLICATION

This application claims priority to Japanese Patent Application No. 2021-155926 filed on Sep. 24, 2021, incorporated herein by reference in its entirety.

BACKGROUND

1. Technical Field

The present disclosure relates to a system and a method of controlling a vehicle group when the vehicle group traveling in a column approaches a traffic signal.

2. Description of Related Art

Japanese Unexamined Patent Application Publication No. 2009-140327 (JP 2009-140327 A) discloses an apparatus that determines whether a vehicle approaching a traffic signal is in a dilemma zone based on cycle information of each color of the traffic signal and traveling information of the vehicle. Whether the vehicle is in the dilemma zone is determined based on speed of the vehicle and a distance between the vehicle and the traffic signal. The dilemma zone means a zone in which a vehicle cannot pass a traffic signal during display of a yellow light and cannot stop before the traffic signal during the display of the yellow light.

Further, in the above apparatus, when a determination result of the dilemma zone is positive, it is determined whether to execute a deceleration control for avoiding the dilemma zone. Then, when it is determined to execute the deceleration control, information is presented to a following vehicle. The information is presented by a lighting lamp, such as a brake lamp or a hazard lamp of the vehicle, or by communication between the vehicle and the following vehicle (vehicle-to-vehicle communication).

SUMMARY

Applying the technology of the above apparatus to a vehicle group traveling in a column is considered. When a determination result of the dilemma zone for a leading vehicle of a vehicle group is positive and it is determined to execute a deceleration control of the leading vehicle, an effect the same as that of the above apparatus is expected. Therefore, in this case, it is possible to cause all vehicles composing the vehicle group to stop before a traffic signal.

However, when determination results of the dilemma zone differ between the leading vehicle and the following vehicle, the following issue arises. Specifically, a case where the determination result of the leading vehicle is negative but the determination result of the following vehicle is positive is considered. The fact that the determination result of the leading vehicle is negative means that the leading vehicle can pass the traffic signal during display of the green or the yellow light, or it can stop before the traffic signal during the display of the yellow light. For this reason, when the determination result of the leading vehicle is negative and the determination result of the following vehicle is positive, only the leading vehicle can pass the traffic signal and a situation where the vehicle group is separated before and after the traffic signal occurs. Therefore, it is desirable to improve the technology to avoid such a situation.

The present disclosure provides a technology capable of restricting a vehicle group traveling in a column from being separated before and after a traffic signal.

A first aspect of the present disclosure is a control system of a vehicle group. Each vehicle composing the vehicle group includes a control device and a communication device. The control device of each vehicle includes a memory that stores various pieces of information and a processor that processes the various pieces of information. The various pieces of information include speed information of a subject vehicle, light color information of a traffic signal provided at a traveling regulation point in front of the vehicle group on a road on which the vehicle group travels in a column, and distance information between the subject vehicle and an entrance of the traveling regulation point. The processor of each control device is configured to predict a vehicle state of the subject vehicle before the traveling regulation point based on the speed information of the subject vehicle, the light color information, and the distance information. The vehicle state includes an unenterable state, and first and second enterable states. The unenterable state indicates a state where, when the traffic signal is changed from a green light to a yellow light, the traveling regulation point is unenterable. The first enterable state indicates a state where, when the traffic signal is changed from a green light to a yellow light, the traveling regulation point is enterable by maintaining speed of the subject vehicle at a start timing of the yellow light after the start timing. The second enterable state indicates a state where, when the traffic signal is changed from a green light to a yellow light, the subject vehicle enters the traveling regulation point if deceleration of the subject vehicle is started at the start timing of the yellow light but the traveling regulation point is enterable if temporary acceleration of the subject vehicle is executed before the start timing. The processor of each control device transmits the information on the predicted vehicle state to a vehicle, other than the subject vehicle, composing the vehicle group. The processor of each control device is further configured to determine, based on the information on the predicted vehicle state, whether a vehicle of which the predicted vehicle state corresponds to the unenterable state is included in the vehicle group, control, upon determining that the vehicle of which the predicted vehicle state corresponds to the unenterable state is included in the vehicle group, the subject vehicle such that the subject vehicle does not enter the traveling regulation point.

In the first aspect, the processor of each control device may be further configured to, when the processor determines that the vehicle of which the predicted vehicle state corresponds to the unenterable state is included in the vehicle group and the predicted vehicle state of the subject vehicle corresponds to the first or the second enterable state, increase a target deceleration of the subject vehicle as compared to when the predicted vehicle state of the subject vehicle corresponds to the unenterable state.

A second aspect of the present disclosure is a control system of a vehicle group. Each vehicle composing the vehicle group includes a control device and a communication device. The control device of each vehicle includes a memory that stores various pieces of information and a processor that processes the various pieces of information. The various pieces of information include speed information of a subject vehicle, light color information of a traffic signal provided at a traveling regulation point in front of the vehicle group on a road on which the vehicle group travels in a column, and distance information between the subject vehicle and an entrance of the traveling regulation point. The processor of each control device is configured to predict a vehicle state of the subject vehicle before the traveling regulation point based on the speed information of the subject vehicle, the light color information, and the distance information. The vehicle state includes an unenterable state, and first and second enterable states. The unenterable state indicates a state where, when the traffic signal is changed from a green light to a yellow light, the traveling regulation point is unenterable. The first enterable state indicates a state where, when the traffic signal is changed from a green light to a yellow light, the traveling regulation point is enterable by maintaining speed of the subject vehicle at a start timing of the yellow light after the start timing. The second enterable state indicates a state where, when the traffic signal is changed from a green light to a yellow light, the subject vehicle enters the traveling regulation point if deceleration of the subject vehicle is started at the start timing of the yellow light but the traveling regulation point is enterable if temporary acceleration of the subject vehicle is executed before the start timing. The processor of each control device transmits the information on the predicted vehicle state to a vehicle, other than the subject vehicle, composing the vehicle group. The processor of each control device is further configured to determine, based on the information on the predicted vehicle state, whether a vehicle of which the predicted vehicle state corresponds to the unenterable state is included in the vehicle group, maintain, when the processor determines that the vehicle of which the predicted vehicle state corresponds to the unenterable state is not included in the vehicle group and the predicted vehicle state of the subject vehicle corresponds to the first enterable state, a target speed of the subject vehicle at a current speed, and increase, when the processor determines that the vehicle of which the predicted vehicle state corresponds to the unenterable state is not included in the vehicle group and the predicted vehicle state of the subject vehicle corresponds to the second enterable state, the target speed of the subject vehicle to a speed higher than the current speed and lower than a permitted upper limit speed.

A third aspect of the present disclosure is a control system of a vehicle group. Each vehicle composing the vehicle group includes a control device and a communication device. The control device of each vehicle includes a memory that stores various pieces of information and a processor that processes the various pieces of information. The various pieces of information include speed information of a subject vehicle, external situation information of the subject vehicle, light color information of a traffic signal provided at the traveling regulation point in front of the vehicle group on a road on which the vehicle group travels in a column, and distance information between the subject vehicle and an entrance of the traveling regulation point. The processor of each control device is configured to predict a vehicle state of the subject vehicle before the traveling regulation point based on the speed information of the subject vehicle, the light color information, and the distance information. The vehicle state includes an unenterable state, and first and second enterable states. The unenterable state indicates a state where, when the traffic signal is changed from a green light to a yellow light, the traveling regulation point is unenterable. The first enterable state indicates a state where, when the traffic signal is changed from a green light to a yellow light, the traveling regulation point is enterable by maintaining speed of the subject vehicle at a start timing of the yellow light after the start timing. The second enterable state indicates a state where, when the traffic signal is changed from a green light to a yellow light, the subject vehicle enters the traveling regulation point if deceleration of the subject vehicle is started at the start timing of the yellow light but the traveling regulation point is enterable if temporary acceleration of the subject vehicle is executed before the start timing. The processor of each control device transmits the information on the predicted vehicle state to a vehicle, other than the subject vehicle, composing the vehicle group. The processor of each control device is further configured to determine, based on the information on the predicted vehicle state, whether a vehicle of which the predicted vehicle state corresponds to the unenterable state is included in the vehicle group, maintain, when the processor determines that the vehicle of which the predicted vehicle state corresponds to the unenterable state is not included in the vehicle group and the predicted vehicle state of the subject vehicle corresponds to the first enterable state, a target speed of the subject vehicle at a current speed, and determine, when the processor determines that the vehicle of which the predicted vehicle state corresponds to the unenterable state is not included in the vehicle group and the predicted vehicle state of the subject vehicle corresponds to the second enterable state, whether a lane change from a first lane in which the vehicle group is traveling in a column to a second lane adjacent to the first lane is executable by the subject vehicle, based on the external situation information of the subject vehicle, execute, upon determining that the lane change is executable by subject vehicle, the lane change, and increase, upon determining that the lane change is not executable by the subject vehicle, the target speed of the subject vehicle to a speed higher than the current speed and lower than a permitted upper limit speed.

In the third aspect, the processor of each control device may be configured to, upon determining that the vehicle of which the predicted vehicle state corresponds to the unenterable state is included in the vehicle group, control the subject vehicle such that the subject vehicle does not enter the traveling regulation point.

In the third aspect, the processor of each control device may be further configured to, when the processor determines that the vehicle of which the predicted vehicle state corresponds to the unenterable state is included in the vehicle group and the predicted vehicle state of the subject vehicle corresponds to the first or the second enterable state, increase a target deceleration of the subject vehicle as compared with when the predicted vehicle state of the subject vehicle corresponds to the unenterable state.

A fourth aspect of the present disclosure is a control method of a vehicle group by a control device of each vehicle composing the vehicle group. The control method includes predicting a vehicle state of a subject vehicle indicating a vehicle on which the control device is mounted before a traveling regulation point based on speed information of the subject vehicle, light color information of a traffic signal provided at a traveling regulation point in front of the vehicle group on a road on which the vehicle group travels in a column, and distance information between the subject vehicle and an entrance of the traveling regulation point, and transmitting the information on the predicted vehicle state to a vehicle, other than the subject vehicle, composing the vehicle group. The vehicle state includes an unenterable state, and first and second enterable states. The unenterable state indicates a state where, when the traffic signal is changed from a green light to a yellow light, the traveling regulation point is unenterable. The first enterable state indicates a state where, when the traffic signal is changed from a green light to a yellow light, the traveling regulation point is enterable by maintaining speed of the subject vehicle at a start timing of the yellow light after the start timing. The second enterable state indicates a state where, when the traffic signal is changed from a green light to a yellow light, the subject vehicle enters the traveling regulation point if deceleration of the subject vehicle is started at the start timing of the yellow light but the traveling regulation point is enterable if temporary acceleration of the subject vehicle is executed before the start timing. The control method further includes determining, based on the information on the predicted vehicle state, whether a vehicle of which the predicted vehicle state corresponds to the unenterable state is included in the vehicle group, and controlling, upon determining that the vehicle of which the predicted vehicle state corresponds to the unenterable state is included in the vehicle group, the subject vehicle such that the subject vehicle does not enter the traveling regulation point.

A fifth aspect of the present disclosure is a control method of a vehicle group by a control device of each vehicle composing the vehicle group. The control method includes predicting a vehicle state of a subject vehicle indicating a vehicle on which the control device is mounted before a traveling regulation point based on speed information of the subject vehicle, light color information of a traffic signal provided at a traveling regulation point in front of the vehicle group on a road on which the vehicle group travels in a column, and distance information between the subject vehicle and an entrance of the traveling regulation point, and transmitting the information on the predicted vehicle state to a vehicle, other than the subject vehicle, composing the vehicle group. The vehicle state includes an unenterable state, and first and second enterable states. The unenterable state indicates a state where, when the traffic signal is changed from a green light to a yellow light, the traveling regulation point is unenterable. The first enterable state indicates a state where, when the traffic signal is changed from a green light to a yellow light, the traveling regulation point is enterable by maintaining the speed of the subject vehicle at a start timing of the yellow light after the start timing. The second enterable state indicates a state where, when the traffic signal is changed from a green light to a yellow light, the subject vehicle enters the traveling regulation point if deceleration of the subject vehicle is started at the start timing of the yellow light but the traveling regulation point is enterable if temporary acceleration of the subject vehicle is executed before the start timing. The control method further includes determining, based on the information on the predicted vehicle state, whether a vehicle of which the predicted vehicle state corresponds to the unenterable state is included in the vehicle group, maintaining, when the control device determines that the vehicle of which the predicted vehicle state corresponds to the unenterable state is not included in the vehicle group and the predicted vehicle state of the subject vehicle corresponds to the first enterable state, a target speed of the subject vehicle at a current speed, and increasing, when the control device determines that the vehicle of which the predicted vehicle state corresponds to the unenterable state is not included in the vehicle group and the predicted vehicle state of the subject vehicle corresponds to the second enterable state, the target speed of the subject vehicle to a speed higher than the current speed and lower than a permitted upper limit speed.

A sixth aspect of the present disclosure is a control method of a vehicle group by a control device of each vehicle composing the vehicle group. The control method includes predicting a vehicle state of a subject vehicle indicating a vehicle on which the control device is mounted before a traveling regulation point based on speed information of the subject vehicle, external situation information of the subject vehicle, light color information of a traffic signal provided at a traveling regulation point in front of the vehicle group on a road on which the vehicle group travels in a column, and distance information between the subject vehicle and an entrance of the traveling regulation point, and transmitting the information on the predicted vehicle state to a vehicle, other than the subject vehicle, composing the vehicle group. The vehicle state includes an unenterable state, and first and second enterable states. The unenterable state indicates a state where, when the traffic signal is changed from a green light to a yellow light, the traveling regulation point is unenterable. The first enterable state indicates a state where, when the traffic signal is changed from a green light to a yellow light, the traveling regulation point is enterable by maintaining speed of the subject vehicle at a start timing of the yellow light after the start timing. The second enterable state indicates a state where, when the traffic signal is changed from a green light to a yellow light, the subject vehicle enters the traveling regulation point if deceleration of the subject vehicle is started at the start timing of the yellow light but the traveling regulation point is enterable if temporary acceleration of the subject vehicle is executed before the start timing. The control method further includes determining, based on the information on the predicted vehicle state, whether a vehicle of which the predicted vehicle state corresponds to the unenterable state is included in the vehicle group, maintaining, when the control device determines that the vehicle of which the predicted vehicle state corresponds to the unenterable state is not included in the vehicle group and the predicted vehicle state of the subject vehicle corresponds to the first enterable state, a target speed of the subject vehicle at a current speed, determining, when the control device determines that the vehicle of which the predicted vehicle state corresponds to the unenterable state is not included in the vehicle group and the predicted vehicle state of the subject vehicle corresponds to the second enterable state, whether a lane change from a first lane in which the vehicle group is traveling in a column to a second lane adjacent to the first lane is executable by the subject vehicle, based on the external situation information of the subject vehicle, executing, upon determining that the lane change is executable by the subject vehicle, the lane change, and increasing, upon determining that the lane change is not executable by the subject vehicle, the target speed of the subject vehicle to a speed higher than the current speed and lower than a permitted upper limit speed.

With each aspect of the present disclosure, the vehicle state of each vehicle composing the vehicle group is predicted and shared among the vehicle group. Further, when it is determined, based on the shared information, that the vehicle of which the predicted vehicle state corresponds to the unenterable state is included in the vehicle group, the subject vehicle is controlled such that the subject vehicle does not enter the traveling regulation point. In other words, each vehicle composing the vehicle group is controlled such that each vehicle does not enter the traveling regulation point. Therefore, it is possible to restrict the vehicle group from being separated at the traveling regulation point.

With each aspect of the present disclosure, when it is determined that the vehicle of which the predicted vehicle state corresponds to the unenterable state is included in the vehicle group and the predicted vehicle state of the subject vehicle corresponds to the first or the second enterable state, a rapid deceleration is executed as compared with when the predicted vehicle state of the subject vehicle corresponds to the unenterable state. Therefore, even when the predicted vehicle state of the subject vehicle corresponds to the first or the second enterable state, it is possible to cause the subject vehicle to stop before the traveling regulation point without causing the subject vehicle to enter the traveling regulation point.

With each aspect of the present disclosure, the vehicle state of each vehicle composing the vehicle group is predicted and shared among the vehicle group. Further, based on the shared information, it is determined whether the vehicle of which the predicted vehicle state corresponds to the unenterable state is included in the vehicle group. Then, when it is determined that the vehicle of which the predicted vehicle state corresponds to the unenterable state is not included in the vehicle group, the target speed of the subject vehicle is maintained at the current speed or the target speed of the subject vehicle is increased according to the predicted vehicle state of the subject vehicle. In other words, each vehicle composing the vehicle group is controlled such that each vehicle enters the traveling regulation point. Therefore, it is possible to restrict the vehicle group from being separated at the traveling regulation point.

With each aspect of the present disclosure, the vehicle state of each vehicle composing the vehicle group is predicted and shared among the vehicle group. Further, based on the shared information, it is determined whether the vehicle of which the predicted vehicle state corresponds to the unenterable state is included in the vehicle group. Further, when it is determined that the vehicle of which the predicted vehicle state corresponds to the unenterable state is not included in the vehicle group, the target speed of the subject vehicle is maintained at the current speed, the lane change is executed by the subject vehicle, or the target speed of the subject vehicle is increased according to the predicted vehicle state of the subject vehicle. In any case, each vehicle composing the vehicle group is controlled such that each vehicle enters the traveling regulation point. Therefore, it is possible to restrict the vehicle group from being separated at the traveling regulation point.

With each aspect of the present disclosure, when it is determined that the vehicle of which the predicted vehicle state corresponds to the unenterable state is included in the vehicle group, the subject vehicle is controlled such that the subject vehicle does not enter the traveling regulation point. In other words, each vehicle composing the vehicle group is controlled such that each vehicle does not enter the traveling regulation point. Therefore, it is possible to restrict the vehicle group from being separated at the traveling regulation point.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, with reference to the drawings, a control system (hereinafter, also simply referred to as a "control system") of a vehicle group according to an embodiment of the present disclosure will be described. However, a control method of the vehicle group according to the embodiment is implemented by computer processing executed in the control system according to the embodiment. Further, in each drawing, the same or corresponding parts are denoted by the same reference signs, and thus descriptions thereof will be simplified or omitted.

First Embodiment

Figure 1:
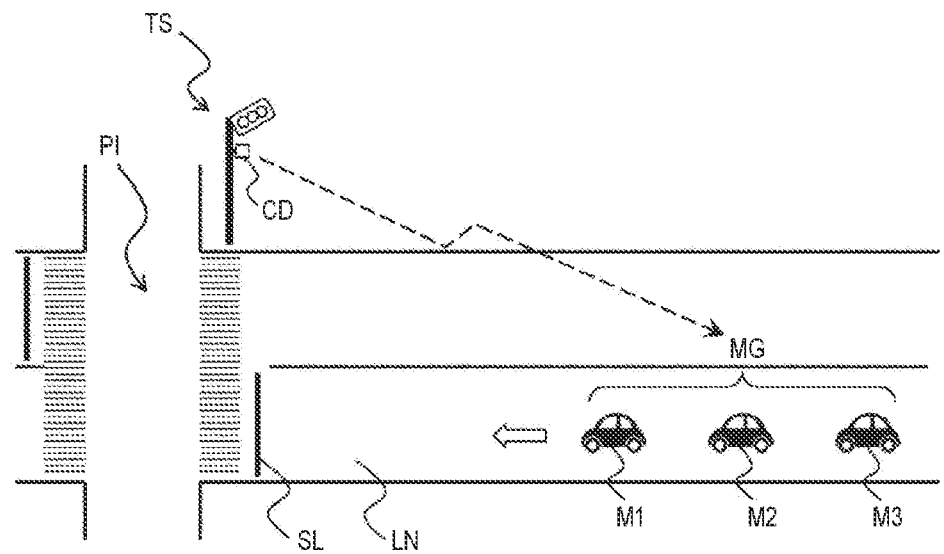
FIG. 1 is a diagram describing an overview of a first embodiment.

First, a first embodiment will be described with reference to FIGS. 1 to 12.
1. Overview of First Embodiment
1-1. Premise FIG. 1 is a diagram describing an overview of the first embodiment. A vehicle group MG traveling in the same direction in a lane LN is depicted in FIG. 1. The vehicle group MG is composed of three vehicles M1 to M3. The vehicle M1 is a leading vehicle of the vehicle group MG, and the vehicle M3 is a last vehicle of the vehicle group MG. However, the vehicle group MG may be composed of two vehicles or may be composed of four or more vehicles.

An intersection PI is located in front of the vehicle group MG. A traffic signal TS is provided at the intersection PI. The intersection PI at which the traffic signal TS is provided is an example of a "traveling regulation point" that regulates traveling of the vehicle group MG. Another example of the "traveling regulation point" can be a point of a road, which is a road other than the intersection and on which a traffic signal is provided on a shoulder thereof. A stop line SL is provided near an entrance of the intersection PI illustrated in FIG. 1. The stop line SL is a line indicating a target position at which a vehicle stands by for entry to the intersection PI while the traffic signal TS is displaying the red light. However, between the stop line SL and the vehicle M1, there are no vehicles other than the vehicles composing the vehicle group MG.

Each of the vehicles M1 to M3 includes a control device. Each control device of the vehicles M1 to M3 executes an autonomous driving control of a subject vehicle. The "subject vehicle" herein means a vehicle having a control device mounted thereon. The autonomous driving control is a vehicle control for causing the subject vehicle to autonomously travel. In the autonomous driving control, steering, acceleration, and deceleration of the subject vehicle are controlled.

The autonomous driving control of each of the vehicles M1 to M3 includes a control for maintaining speed of the subject vehicle at a set speed equal to or lower than a permitted upper limit speed. The autonomous driving control of each of the vehicles M1 to M3 further includes a control for causing each vehicle to follow the traveling of a preceding vehicle. The "preceding vehicle" herein is a vehicle that travels one vehicle ahead from the viewpoint of the subject vehicle. The autonomous driving control of each of the vehicles M1 to M3 also includes a control for avoiding a collision with an obstacle in front of the subject vehicle.

Each of the vehicles M1 to M3 also includes a communication device. Each communication device of the vehicles M1 to M3 executes "vehicle-to-vehicle communication (hereinafter, also referred to as "V2V communication")". In the V2V communication, the communication device of the vehicle M1 transmits various pieces of information to the vehicles M2, M3. Further, the communication device of the vehicle M1 receives various pieces of information from the vehicles M2, M3. The communication device of the vehicle M2 transmits various pieces of information to the vehicles M1, M3, and receives various pieces of information therefrom. The communication device of the vehicle M3 transmits various pieces of information to the vehicles M1, M2, and receives various pieces of information therefrom.

The various pieces of information exchanged between the vehicles include information on the vehicle state of each vehicle. Examples of the information of the vehicle state include speed information and position information (for example, latitude and longitude information) of the vehicle. The information of the vehicle state also includes information on a "predicted vehicle state" described below.

Each communication device of the vehicles M1 to M3 also executes "road-to-vehicle communication (hereinafter, also referred to as "V2I communication")". In the V2I communication, each communication device of the vehicles M1 to M3 receives various pieces of information from a communication device CD of the traffic signal TS.

The various pieces of information from the communication device CD include position information (for example, latitude and longitude information) of the traffic signal TS or the stop line SL corresponding to the traffic signal TS, and light color information. Examples of the light color information include information on a color of a light currently being lit (for example, green or red) and information on a remaining time until the color is changed to another color. However, the various pieces of information from the communication device CD may be presented from the vehicle (for example, the vehicle M1) that executes the V2I communication to another vehicle (for example, the vehicles M2, M3) by the V2V communication.

Figure 2:
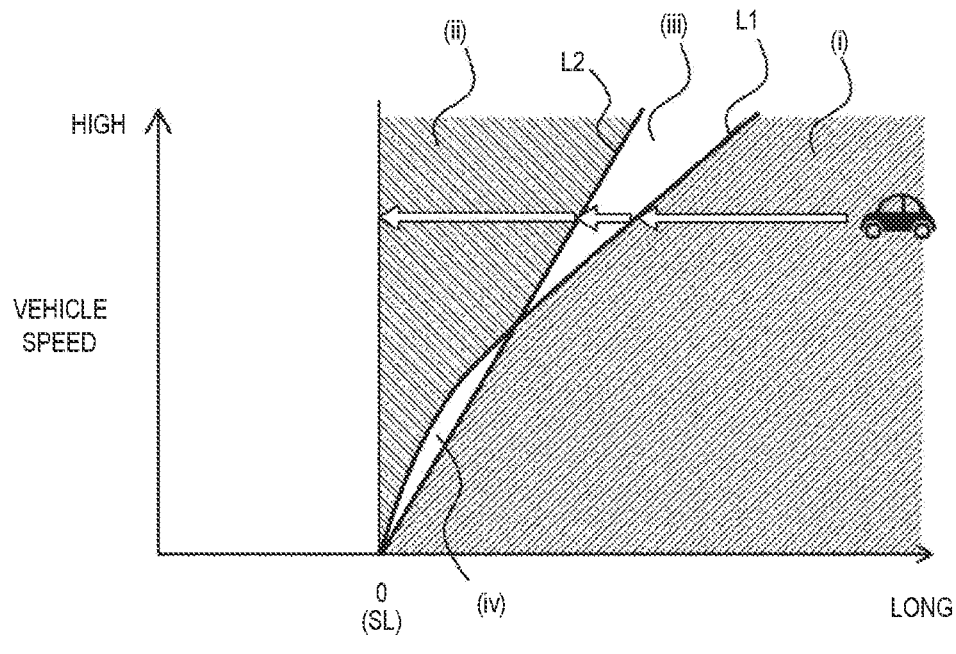
FIG. 2 is a graph illustrating an example of a relationship between a distance between a position of a subject vehicle at a start timing of the yellow light and a stop line, and a vehicle speed.

1-2. Autonomous Driving Control Before Intersection PI 1-2-1. Vehicle State at Yellow Light First, with reference to FIG. 2, the vehicle state of the subject vehicle at a start timing of the traffic signal TS from the green light to the yellow light will be described. FIG. 2 is a graph illustrating an example of a relationship between a distance between the position of the subject vehicle at a start timing of the yellow light and the stop line SL, and the vehicle speed. A curve L1 illustrated in FIG. 2 represents the vehicle state (the distance to the stop line SL and the vehicle speed) where the subject vehicle can stop at the position of the stop line SL when the deceleration of the subject vehicle to deceleration (hereinafter, also referred to as "permitted deceleration C0") permitted to the subject vehicle is started from the start timing of the yellow light. A straight line L2 represents a vehicle state where the subject vehicle can reach the position of the stop line SL when it travels while maintaining the speed of the subject vehicle at the start timing of the yellow light from the start timing of the yellow light to the start timing of the red light.

A vehicle state in a region (i) illustrated on the right side of the curve L1 means a state where the subject vehicle can stop at a position before the stop line SL by decelerating to a speed equal to or lower than the permitted deceleration C0 from the start timing of the yellow light. A vehicle state in a region (ii) illustrated on the left side of the straight line L2 means a state where the subject vehicle can enter the intersection PI exceeding the position of the stop line SL when it travels while maintaining the speed of the subject vehicle at the start timing of the yellow light from the start timing of the yellow light to the start timing of the red line.

A vehicle state in a region (iii) illustrated on the left side of the curve L1 and on the right side of the straight line L2 means a state where the subject vehicle exceeds the position of the stop line SL when it decelerates to the permitted deceleration C0 from the start timing of the yellow light. The vehicle state of the region (iii) also means a state where the subject vehicle exceeds the position of the stop line SL after the start timing of the red light when it travels while maintaining the speed of the subject vehicle at the start timing of the yellow light from the start timing of the yellow light to the start timing of the red light. In other words, in the vehicle state of the region (iii), when the subject vehicle proceeds while maintaining the vehicle speed, it ignores the signal, and when the subject vehicle travels at the permitted deceleration C0, it exceeds the position of the stop line SL. Therefore, the region (iii) is also referred to as a dilemma zone.

A region (iv) illustrated on the right side of the curve L1 and on the left side of the straight line L2 is a region in which the region (i) and the region (ii) overlap. In a vehicle state of the region (iv), when the subject vehicle travels while maintaining the speed of the subject vehicle at the start timing of the yellow light, it can enter the intersection PI by the start timing of the red light, and when the subject vehicle travels at the permitted deceleration C0, it can also stop at the position of the stop line SL. Therefore, the region (iv) is also referred to as an option zone.

1-2-2. Vehicle State Before Intersection PI

The vehicle state described in FIG. 2 can be predicted before the start timing of the yellow light. In the embodiment, each control device of the vehicles M1 to M3 predicts the vehicle state of the subject vehicle before the intersection PI based on various pieces of information. The predicted vehicle state (hereinafter, also referred to as a "predicted state PS") is divided into an unenterable state SUA, a first enterable state SAB1, and a second enterable state SAB2. Hereinafter, for convenience of description, the unenterable state SUA is also referred to as a "state SUA". Further, the first enterable state SAB1 is also referred to as a "state SAB1", and the second enterable state SAB2 is also referred to as a "state SAB2".

The state SUA indicates a state where it is impossible to enter the intersection PI when the traffic signal TS has been changed from the green light to the yellow light. The state SAB1 indicates a state where it is possible to enter the intersection PI by maintaining the speed of the subject vehicle at the start timing of the yellow light after the start timing thereof when the traffic signal TS has been changed from the green light to the yellow light. The state SAB2 indicates a state where, when the traffic signal TS has been changed from the green light to the yellow light, the subject vehicle enters the intersection PI if deceleration of the subject vehicle is started at the start timing of the yellow light but it is possible to enter the intersection PI if temporary acceleration of the subject vehicle is executed before the start timing.

Figure 3:
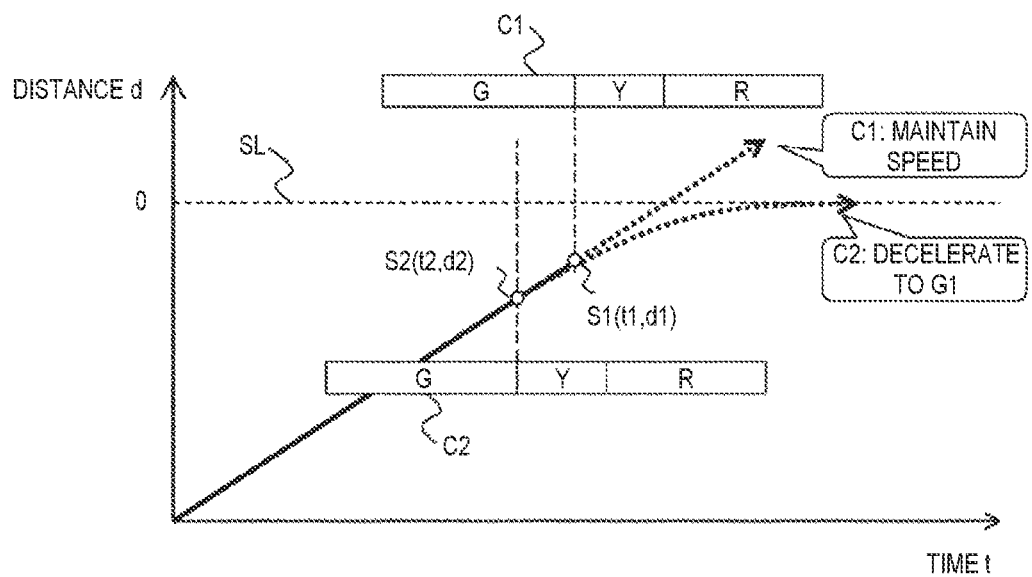
FIG. 3 is a graph describing a vehicle state of a leading vehicle before an intersection illustrated in FIG. 1.

FIG. 3 is a graph describing one example of the vehicle state of the vehicle M1 before the intersection PI illustrated in FIG. 1. As illustrated in FIG. 3, the vehicle state of the vehicle M1 before the intersection PI can be predicted by a distance d between the vehicle M1 and the entrance of the intersection PI (that is, the stop line SL) and a required time t until the vehicle M1 reaches the entrance. The required time t is calculated using the distance d and the current speed of the vehicle M1. Further, the distance d is calculated using the position information of the traffic signal TS or the stop line SL, and the position information of the vehicle M1.

"G", "Y", and "R" illustrated in FIG. 3 represent the light colors of the traffic signal TS. As illustrated in FIG. 3, in the traffic signal TS, the light colors are changed in order of "G", "Y", and "R". The widths of the light colors extending in the time axis direction in FIG. 3 illustrate examples of the lengths of the lighting times of the colors, respectively. As examples of lighting time, FIG. 3 illustrates lighting examples C1 and C2. In these examples, the light color is changed from "G" to "Y" while the vehicle M1 is approaching the stop line SL.

While the vehicle M1 is traveling at a constant speed, the vehicle M1 gradually approaches the stop line SL with the passage of time t. When the vehicle M1 reaches the stop line SL, the distanced becomes zero. In the lighting example C1, the speed of the vehicle M1 is maintained before and after timing t1 at which the light color is changed from "G" to "Y". As a result, the vehicle M1 passes the position of the stop line SL before the timing at which the light color is changed from "Y" to "R". The vehicle state of the vehicle M1 at timing t1 corresponds to an example of the "state SAB1".

On the other hand, the lighting example C2 is an example where, at timing t2 at which the light color is changed from "G" to "Y", it is possible to start deceleration by setting a target deceleration to a deceleration G1 (for example, the deceleration equal to or lower than the permitted deceleration C0) and cause M1 to stop before the stop line SL. In other words, the vehicle state of the vehicle M1 at the timing after timing t2 corresponds to an example of the "state SUA".

However, the vehicle state of the vehicle M1 described in FIG. 3 can also be applied to the description of the vehicle states of the vehicles M2, M3.

1-2-3. Prediction of Vehicle State Using V2I Communication Information

Here, the predicted state PS of the vehicle M1 at timing t1 in the lighting example C1 is represented as S1(t1,d1). The various pieces of information from the traffic signal TS are acquired before timing t1. For that reason, the control device of the vehicle M1 calculates the predicted state PS of the vehicle M1 at timing t1 before timing t1. In other words, in the case of the lighting example C1, the fact that the predicted state PS of the vehicle M1 becomes the vehicle state S1(t1,d1) is calculated before timing t1.

When the predicted state PS of the vehicle M1 is the vehicle state S1(t1,d1) described in FIG. 3, it can be said that the vehicle state of the vehicle M1 before the intersection PI corresponds to the "state SAB1". Therefore, in this case, the control device of the vehicle M1 executes the autonomous driving control for maintaining the current speed of the vehicle M1 before and after the calculation of the predicted state PS of the vehicle M1 at timing t1. As such, the vehicle M1 enters the intersection PI and passes through the intersection PI.

Further, here, the predicted state PS of the vehicle M1 at timing t2 in the lighting example C2 is represented as S2(t2,d2). Similar to the calculation at timing t1 described above, the predicted state PS of the vehicle M1 at timing t2 is also calculated before timing t2. In other words, in the case of the lighting example C2, the fact that the predicted state PS of the vehicle M1 becomes the vehicle state S2(t2,d2) is calculated before timing t2. For this reason, in this case, the control device of the vehicle M1 executes the autonomous driving control for setting the target deceleration to the deceleration G1 and causing the subject vehicle to decelerate. As such, the vehicle M1 stops before the stop line SL.

However, in the case of the lighting example C2, it is also possible to cause the vehicle M1 to enter the intersection PI. An example of the autonomous driving control in this case will be described with reference to FIG. 4. As already described, the predicted state PS of the vehicle M1 at timing t2 is calculated before timing t2. A timing at which this calculation is completed is timing t3. In an example illustrated in FIG. 4, the autonomous driving control for causing the vehicle M1 to temporarily accelerate is executed after timing t3 and before timing t2. Then, the situation may be changed to a situation where the vehicle M1 is permitted to enter the intersection PI. In this case, the vehicle M1 can enter the intersection PI by the same thoughts as in the case of the lighting example C1.

Here, the permitted upper limit speed of the vehicle M1 is considered. Then, it is possible to increase the speed of the vehicle M1 to the permitted upper limit speed by causing the vehicle M1 to temporarily accelerate, and as such, it is possible to specify timing t4 at which the situation is changed to a situation where the vehicle M1 is permitted to enter the intersection PI. Therefore, timing t4 can be specified before timing t2. Then, it can be said that the vehicle state between the vehicle state S2(t2,d2) described in FIG. 3 and the predicted state PS (the vehicle state S4(t4,d4)) of the vehicle M1 at timing t4 described in FIG. 4 corresponds to the "state SAB2".

The permitted upper limit speed may be, for example, an upper limit speed of the vehicle M1 in the autonomous driving control of the vehicle M1. Therefore, it can be said that the vehicle state where it is necessary to increase the speed of the vehicle M1 to the permitted upper limit speed before timing t4 is the "state SUA". Further, even when the vehicle state is predicted to be the "state SAB1" or the "SAB2", the vehicle state may be predicted to be the "state SUA" depending on the external situation of the vehicle M1. This case will be described with reference to FIG. 5.

Figure 5:
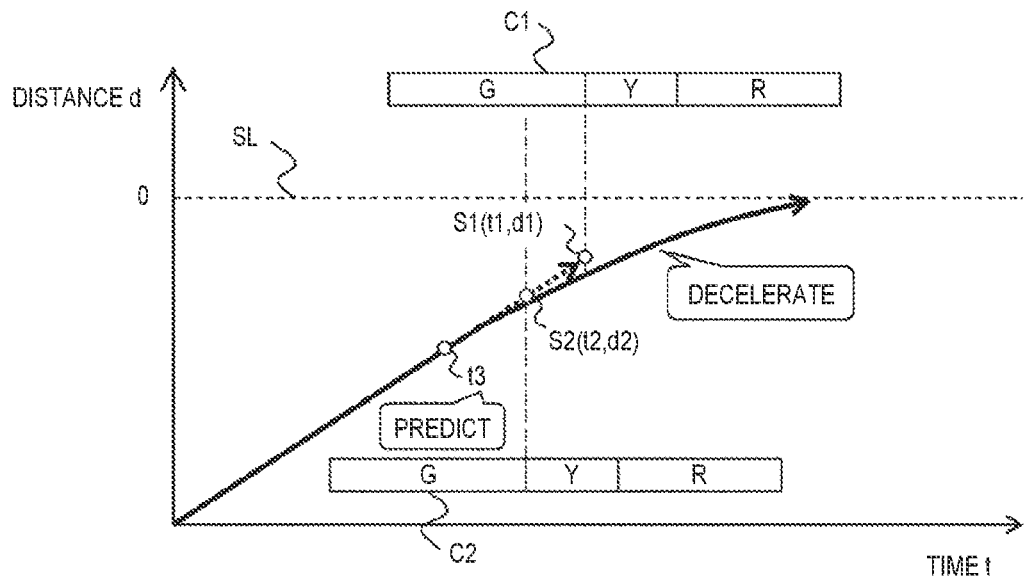
FIG. 5 is a graph describing a case where the vehicle state of the leading vehicle is predicted to be an unenterable state.

FIG. 5 is a graph describing a case where the predicted state PS of the vehicle M1 is calculated to be the "state SUA". FIG. 1 has been described on the premise that there are no vehicles other than the vehicles composing the vehicle group MG between the stop line SL and the vehicle M1. However, there may be a deceleration factor (for example, a preceding vehicle of the vehicle M1) between the stop line SL and the vehicle M1. In this case, the autonomous driving control for causing the vehicle M1 to decelerate may be started after timing t3. Then, the vehicle state of the vehicle M1 at timing t2 is changed, and the vehicle M1 may not be able to enter the intersection PI. It can be said that the vehicle state in this case is the "state SUA".

Figure 4:
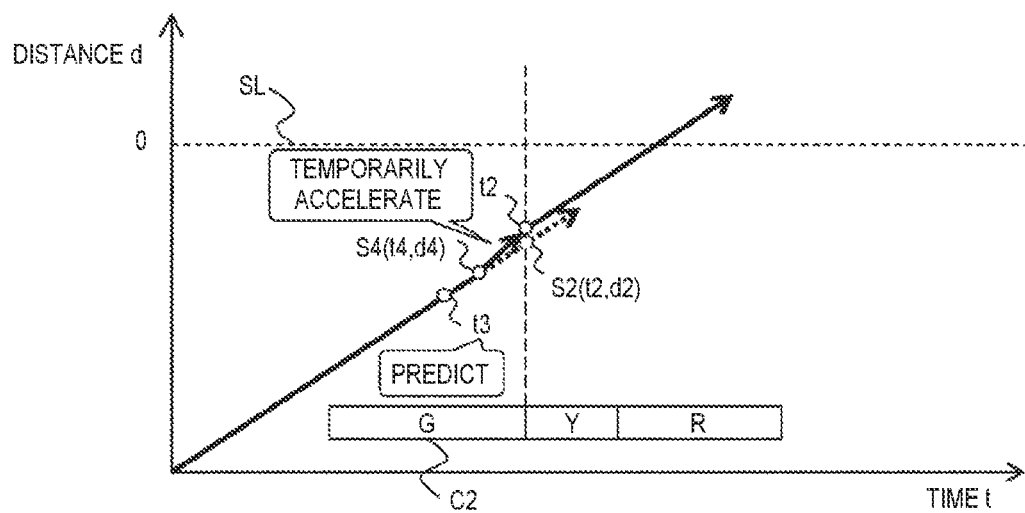
FIG. 4 is a graph describing an example of an autonomous driving control for causing the leading vehicle to enter the intersection.

The calculation of the predicted state PS of the vehicle M1 described in FIGS. 4 and 5 can also be applied to the description of the calculation of the predicted states PSs of the vehicles M2, M3 (however, the calculation of the predicted state PS when there is a deceleration factor is excluded). As such, in the first embodiment, the predicted state PS of the subject vehicle before the intersection PI is calculated by each control device of the vehicles M1 to M3.

1-2-4. Autonomous Driving Control of Each Vehicle Using Predicted Vehicle State

Further, in the first embodiment, each control device of the vehicles M1 to M3 individually executes the autonomous driving control before the intersection PI based on the predicted states PSs of these vehicles. However, in order to avoid the vehicle group GM from being separated at the intersection PI, in the first embodiment, the autonomous driving control is executed such that operations (specifically, the entry/non-entry to the intersection PI) of the vehicle group MG regarding the entry to the intersection PI are the same. An example of such an autonomous driving control will be described below.

(1) EXAMPLE 1

Figure 6:
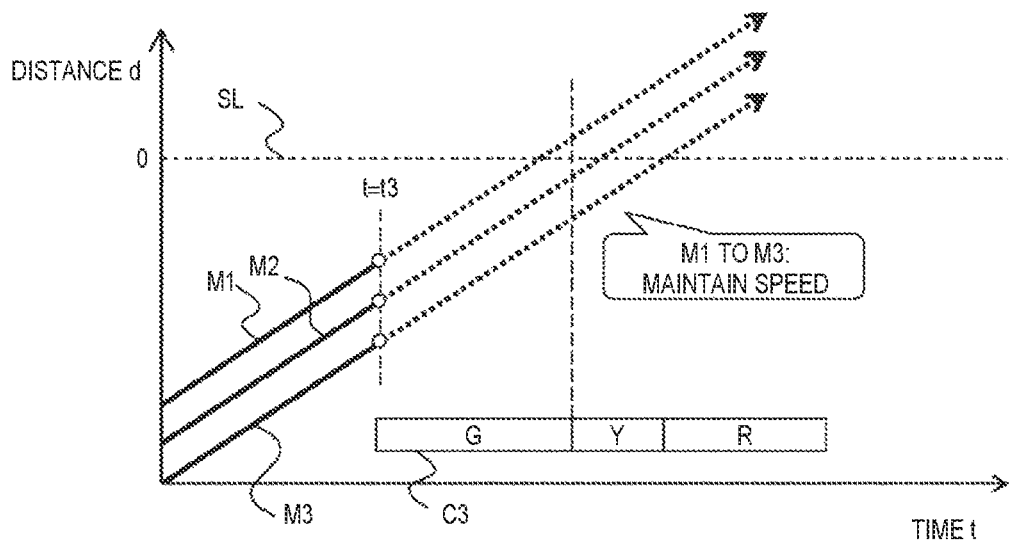
FIG. 6 is a graph describing an example 1 of the autonomous driving control before the intersection.

FIG. 6 is a graph describing an example 1 of the autonomous driving control before the intersection PI. In the example 1, the predicted states PSs of all the vehicles M1 to M3 are calculated to be the "state SAB1". Further, in the example 1, there is no deceleration factor between the stop line SL and the vehicle M1. Therefore, in the example 1, each control device of the vehicles M1 to M3 executes the autonomous driving control for setting the target speed of the subject vehicle to the current speed and maintaining the current speed of the subject vehicle. As such, all the vehicles M1 to M3 enter the intersection PI and pass through the intersection PI.

(2) EXAMPLE 2

Figure 7:
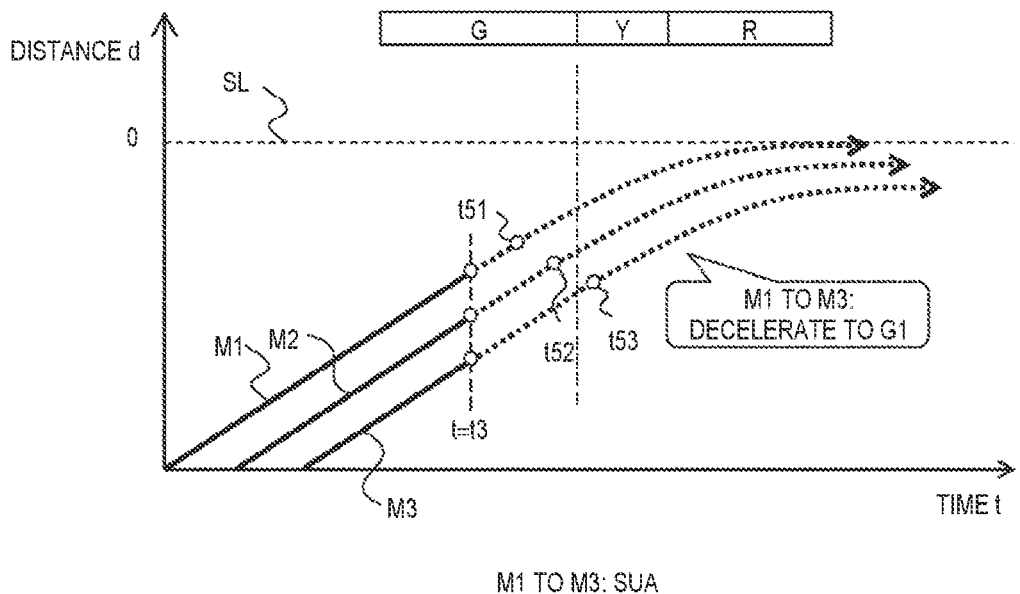
FIG. 7 is a graph describing an example 2 of the autonomous driving control before the intersection.

FIG. 7 is a graph describing an example 2 of the autonomous driving control before the intersection PI. In the example 2, the predicted states PSs of all the vehicles M1 to M3 are calculated to be the "state SUA". Further, in the example 2, there is no deceleration factor between the stop line SL and the vehicle M1. Therefore, in the example 2, each control device of the vehicles M1 to M3 executes the autonomous driving control for setting the target deceleration to the deceleration G1 and causing the subject vehicle to decelerate. As such, the vehicle M1 stops before the stop line SL without entering the intersection PI. Further, the vehicle M2 stops behind the vehicle M1, and the vehicle M3 stops behind the vehicle M2.

In the example 2, the deceleration of the vehicle M1 is started at timing t51, the deceleration of the vehicle M2 is started at timing t52, and the deceleration of the vehicle M3 is started at timing t53. A reason for which the deceleration start timing is changed in such a manner is as follows. It is because, when the deceleration start timing of the vehicle M3 is timing t51, the deceleration is started too early and it may give a sense of discomfort to a driver of the following vehicle of the vehicle M3.

However, the above issue can be solved by delaying timing t51 itself. In this case, the deceleration start timing of each of the vehicles M1 to M3 may be aligned. In this case, in the autonomous driving control of each vehicle, the target deceleration is set to deceleration G2 (G1<G2<C0). When the target deceleration is set to the deceleration G2, the deceleration is executed more rapidly than when the target deceleration is set to the deceleration G1, and thus it is possible to cause the vehicles M1 to M3 to stop before the stop line SL.

(3) EXAMPLE 3

Figure 8:
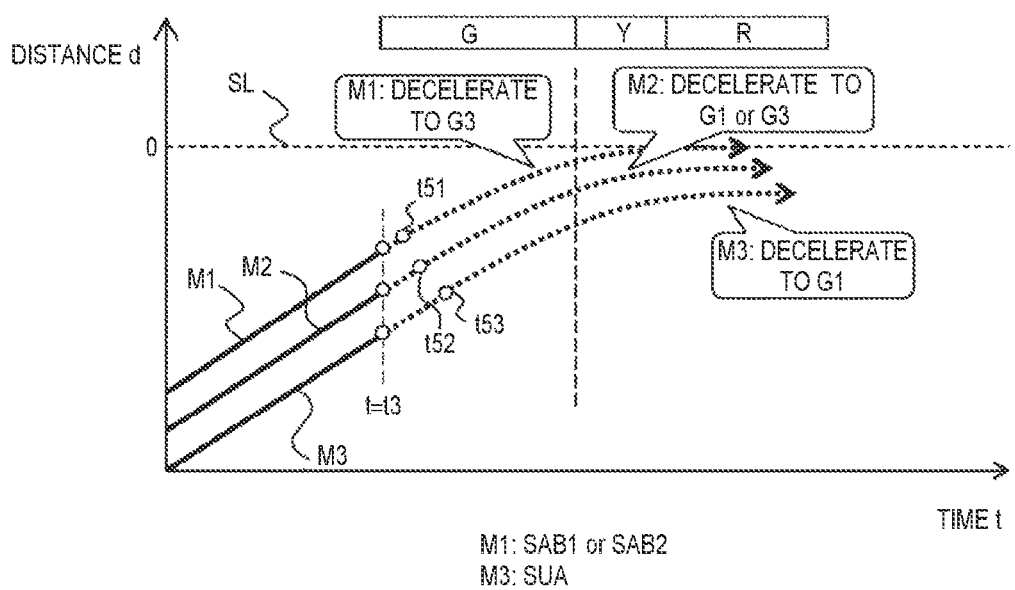
FIG. 8 is a graph describing an example 3 of the autonomous driving control before the intersection.

FIG. 8 is a graph describing an example 3 of the autonomous driving control before the intersection PI. In the example 3, the predicted state PS of the vehicle M1 is calculated to be the "state SAB1" or the "state SAB2". On the other hand, the predicted state PS of the vehicle M3 is calculated to be the "state SUA". Then, in the example 3, the autonomous driving control for causing each of the vehicles M1 to M3 to stop before the stop line SL is executed. Specifically, the control device of the vehicle M1 executes the autonomous driving control for setting the target deceleration to the deceleration G3 (G1<G3<C0) and causing the subject vehicle to decelerate. Further, the control device of the vehicle M3 executes the autonomous driving control for setting the target deceleration to the deceleration G1 and causing the subject vehicle to decelerate.

The control device of the vehicle M2 executes the autonomous driving control for causing the subject vehicle to decelerate according to the result of the predicted state PS of the vehicle M2. In other words, when the predicted state PS of the vehicle M2 is calculated to be the "state SAB1" or the "state SAB2", the target deceleration is set to the deceleration G3 in the autonomous driving control. When the predicted state PS of the vehicle M2 is calculated to be the "state SUA", the target deceleration is set to the deceleration G1. In the latter case, the target deceleration may be set to the deceleration G3.

In any case, in the example 3, the target deceleration of the vehicle M1 is set to the deceleration G3. In other words, in the example 3, the target deceleration of the vehicle M1 is set to a value higher than that in the example 2.

(4) EXAMPLE 4

Figure 9:
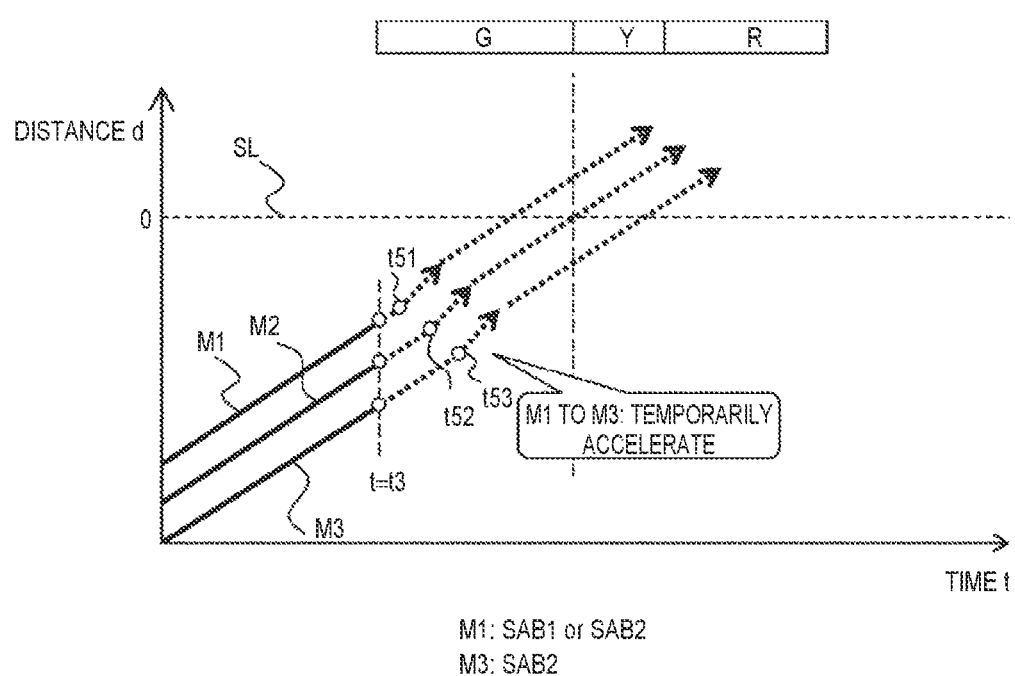
FIG. 9 is a graph describing an example 4 of the autonomous driving control before the intersection.

FIG. 9 is a graph describing an example 4 of the autonomous driving control before the intersection PI. In the example 4, the predicted state PS of the vehicle M1 is calculated to be the "state SAB1" or the "state SAB2". On the other hand, the predicted state PS of the vehicle M3 is calculated to be the "state SAB2". Then, in the example 4, the autonomous driving control for causing all the vehicles M1 to M3 to enter the intersection PI is executed. Specifically, each control device of the vehicles M1 to M3 executes the autonomous driving control for causing the subject vehicle to temporarily accelerate. The target acceleration during the autonomous driving control is set for each vehicle based on the current speed and the target speed (<permitted upper limit speed).

As such, with the first embodiment, the predicted state PS of each of the vehicles M1 to M3 is calculated based on the various pieces of information acquired before the intersection PI, and the information of the predicted state PS is shared among the vehicles M1 to M3. Then, using the shared information, the autonomous driving control of each of the vehicles M1 to M3 is executed such that the operations of the vehicle group MG regarding the entry to the intersection PI are aligned. Therefore, it is possible to restrict the vehicle group GM from being separated at the intersection PI.

Hereinafter, the control system according to the first embodiment will be described in detail.

2. Control System 2-1. Entire Configuration Example

Figure 10:
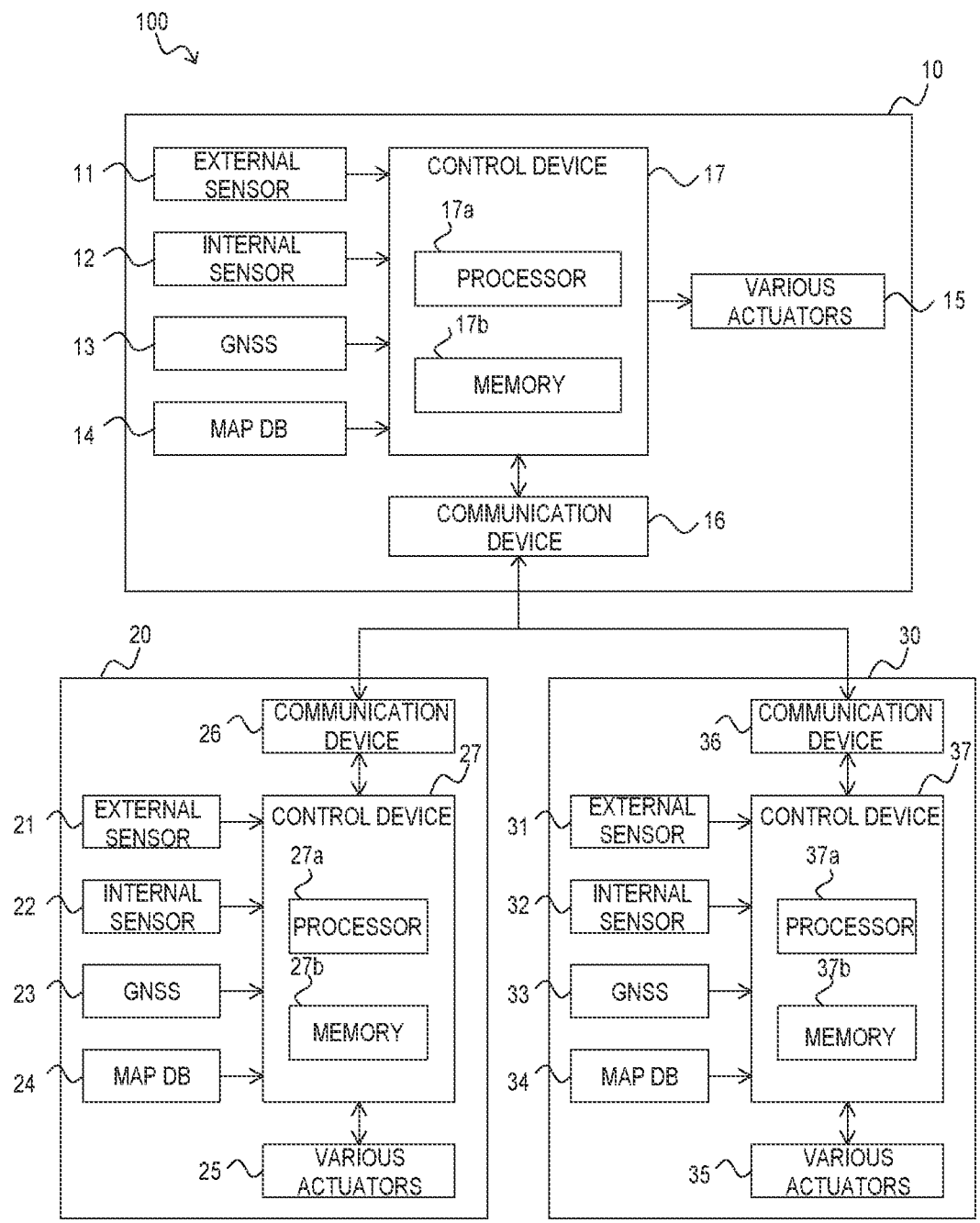
FIG. 10 is a block diagram illustrating a configuration example of a control system according to the first embodiment.

FIG. 10 is a block diagram illustrating a configuration example of the control system according to the first embodiment. As illustrated in FIG. 10, a control system 100 includes a vehicle system 10, a vehicle system 20, and a vehicle system 30. The vehicle system 10 is mounted on the vehicle M1. The vehicle system 20 is mounted on the vehicle M2. The vehicle system 30 is mounted on the vehicle M3.

As a configuration for executing the autonomous driving control, the vehicle system 10 includes an external sensor 11, an internal sensor 12, a global navigation satellite system (GNSS) receiver 13, and a map database 14. The vehicle system 10 also includes various actuators 15, a communication device 16, and a control device 17.

The external sensor 11 is a device that detects the external situation of the vehicle M1. Examples of the external sensor 11 include a radar sensor and a camera. The radar sensor detects a target around the vehicle M1 using radio waves (for example, millimeter waves) or light. Examples of the target include a static target and a dynamic target. Examples of the static target include a guardrail and a building. Examples of the dynamic target include a pedestrian, a bicycle, a motorcycle, and a vehicle other than the vehicle M1. The camera captures an image of the external situation of the vehicle M1.

The internal sensor 12 is a device that detects a traveling state of the vehicle M1. Examples of the internal sensor 12 include a vehicle speed sensor, an acceleration sensor, and a yaw rate sensor. The vehicle speed sensor detects a traveling speed of the vehicle M1. The acceleration sensor detects acceleration of the vehicle M1. The yaw rate sensor detects a yaw rate around the vertical axis of the center of gravity of the vehicle M1.

The GNSS receiver 13 is a device that receives signals from three or more artificial satellites. The GNSS receiver 13 is also a device that acquires position information of the vehicle M1. The GNSS receiver 13 calculates the position and an attitude (the direction) of the vehicle M1 based on the received signals.

The map database 14 is a database that stores map information. Examples of the map information include road position information, road shape information (for example, types of a curve and a straight line), and position information of an intersection, a stop line corresponding to the intersection, and a structure. The map information also includes traffic regulation information. The map database 14 is formed in an in-vehicle storage device (for example, a hard disk or a flash memory). The map database 14 may be formed in a computer of a facility (for example, a management center) capable of communicating with the vehicle M1.

The various actuators 15 are included in a traveling device of the vehicle M1. Examples of the various actuators 15 include a drive actuator, a braking actuator, and a steering actuator. The drive actuator drives the vehicle M1. The braking actuator applies a braking force to the vehicle M1. The steering actuator steers tires of the vehicle M1.

The communication device 16 includes a transmission antenna and a reception antenna used for executing wireless communication (that is, the V2V and the V2I communication) with the vehicle M2, the vehicle M3, or the communication device CD. The wireless communication is executed using, for example, a directional beam composed of a narrow beam formed by a directional transmission antenna. When the V2V communication is executed using the narrow beam, a synchronization system that executes beam matching using a pilot signal may be used. The frequency of the wireless communication may be, for example, several hundred MHz lower than 1 GHz, or may be a high frequency band equal to or higher than 1 GHz.

When the V2V communication is executed using the narrow beam, beams may be synchronized using the pilot signal. For example, the pilot signals are transmitted from the vehicle M1 to the vehicles M2, M3, the pilot signals of the narrow beams are detected in a wide beam mode or an omnidirectional beam mode by the vehicles M2, M3, and the directions of the narrow beams of these vehicles are adjusted based on the detection results.

The control device 17 is composed of a microcomputer having at least one processor 17a and at least one memory 17b. The memory 17b stores at least one program. The memory 17b also stores the various pieces of information acquired by the V2V and the V2I communication. When the processor 17a reads out and executes the program stored in the memory 17b, various functions of the control device 17 are implemented. The functions include the calculation of the predicted state PS of the vehicle M1 described above. The functions also include a function of executing the autonomous driving control of the vehicle M1 using the various actuators 15.

The vehicle system 20 includes an external sensor 21, an internal sensor 22, a GNSS receiver 23, and a map database 24. The vehicle system 20 also includes various actuators 25, a communication device 26, and a control device 27. The vehicle system 30 includes an external sensor 31, an internal sensor 32, a GNSS receiver 33, and a map database 34. The vehicle system 30 also includes various actuators 35, a communication device 36, and a control device 37. In other words, basic configurations of the vehicle systems 20, 30 are the same as that of the vehicle system 10. For this reason, refer to the description of the vehicle system 10 for examples of individual components of the vehicle systems 20, 30.

Figure 11:
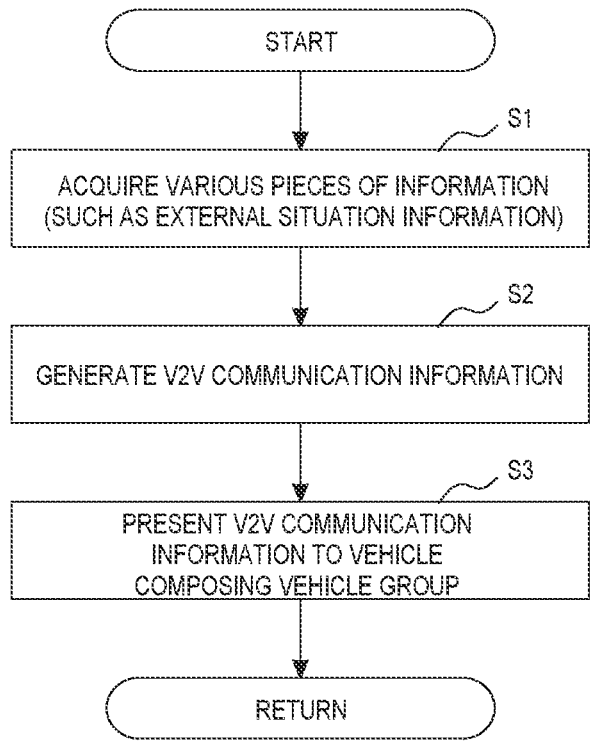
FIG. 11 is a flowchart describing a flow of processing associated with vehicle-to-vehicle communication executed by a control device of each vehicle composing a vehicle group.

2-2. Processing Example Executed by Each Control Device 2-2-1. Processing Example Associated with V2V Communication FIG. 11 is a flowchart describing a flow of processing associated with the V2V communication executed by each control device (each processor) of the vehicles M1 to M3. A routine illustrated in FIG. 11 is repeatedly executed in a predetermined control cycle.

In the routine illustrated in FIG. 11, first, various pieces of information of the subject vehicle are acquired (step S1). Examples of the various pieces of information acquired in the process of step S1 include external situation information from the external sensor, traveling state information from the internal sensor, position and attitude information from the GNSS receiver, and V2I communication information from the communication device.

Following the process in step S1, the V2V communication information is generated (step S2). Examples of the V2V communication information include speed information and position information of the subject vehicle. The speed information is generated based on, for example, the traveling state information (vehicle speed sensor information). The position information is generated based on, for example, latitude and longitude information of the subject vehicle and the map information. The V2V communication information also includes the predicted state PS. The predicted state PS is generated when the subject vehicle approaches the intersection PI. The predicted state PS is generated based on, for example, the speed information of the subject vehicle, the latitude and longitude information of the subject vehicle, the latitude and longitude information of the traffic signal TS, the map information, and the light color information.

Following the process in step S2, the V2V communication information generated in step S2 is transmitted (step S3). A transmission destination of the V2V communication information is a vehicle, other than the subject vehicle, from among the vehicles composing the vehicle group MG.

2-2-2. Processing Example Associated with Autonomous Driving Control

Figure 12:
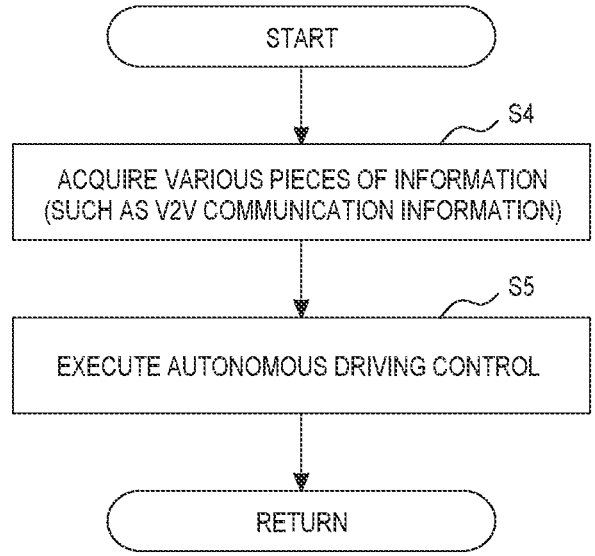
FIG. 12 is a flowchart describing a flow of processing associated with the autonomous driving control executed by the control device of each vehicle composing the vehicle group.

FIG. 12 is a flowchart describing a flow of processing associated with the autonomous driving control executed by each control device (each processor) of the vehicles M1 to M3. A routine illustrated in FIG. 12 is repeatedly executed in a predetermined control cycle.

In the routine illustrated in FIG. 12, first, various pieces of information of the subject vehicle are acquired (step S4). Examples of the various pieces of information acquired in the process of step S4 include the external situation information from the external sensor, the traveling state information from the internal sensor, the position and attitude information from the GNSS receiver, and the V2I and the V2V communication information from the communication device.

Following the process in step S4, the autonomous driving control of the subject vehicle is executed (step S5). The content of processing of the autonomous driving control is changed depending on whether the V2V communication information includes the information of the predicted state PS. First, processing when the V2V communication information does not include the information of the predicted state PS will be described. In this case, the processor generates a target trace of the subject vehicle based on the various pieces of information acquired in step S4. The target trace is a set of target positions that the subject vehicle should reach. The target trace includes, for example, the target speed of the subject vehicle for each target position. The processor calculates a deviation (for example, a lateral deviation, a yaw deviation, and a speed deviation) between the subject vehicle and the target trace and controls steering, acceleration, deceleration of the subject vehicle such that these variations are reduced.

Figure 13:
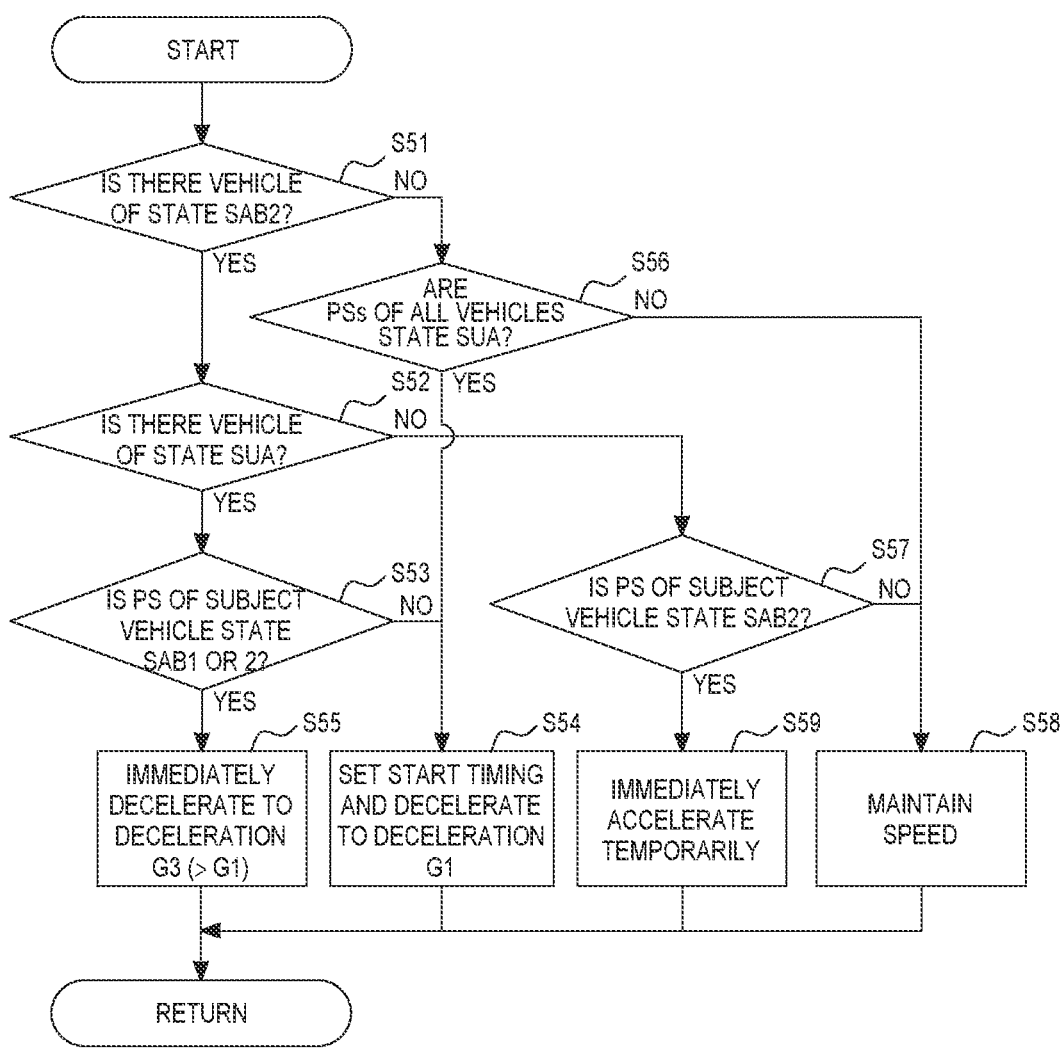
FIG. 13 is a flowchart describing a flow of processing executed by the control device of each vehicle when predicted vehicle information is included in the vehicle-to-vehicle communication information.

Processing when the V2V communication information includes the information of the predicted state PS will be described with reference to FIG. 13. In the routine illustrated in FIG. 13, first, based on the information of the predicted state PS, it is determined whether a vehicle of which the predicted state PS corresponds to the state SAB2 is included in the vehicle group MG (step S51). As already described, the state SAB2 indicates the state where it is possible to enter the intersection PI before the traffic signal TS turns to the yellow light when the temporary acceleration of the subject vehicle is executed. When the determination result in step S51 is negative, the process proceeds to step S56 described below.

When the determination result in step S51 is positive, it is determined whether a vehicle of which the predicted state PS corresponds to the state SUA is included in the vehicle group MG (step S52). As already described, the state SUA indicates the state where it is impossible to enter the intersection PI before the traffic signal TS turns to the yellow light. When the determination result in step S52 is negative, the process proceeds to step S57 described below.

When the determination result in step S52 is positive, it can be determined that a vehicle that cannot enter the intersection PI before the traffic signal TS turns to the yellow light is included in the vehicle group MG. For this reason, in this case, in order to avoid the vehicle group MG from being separated at the intersection PI, the vehicle group MG is controlled such that it does not enter the intersection PI. Specifically, it is determined whether the predicted state PS of the subject vehicle is the state SAB1 or SAB2 (step S53). As already described, the state SAB1 indicates the state where it is possible to enter the intersection PI before the traffic signal turns to the yellow light when the speed of the subject vehicle is maintained at the current speed.

When the determination result in step S53 is negative, it means that the predicted state PS of the subject vehicle is the state SUA. Therefore, in this case, deceleration to the deceleration G1 is executed. Specifically, the processor sets a target stop position of the subject vehicle based on the various pieces of information acquired in step S4 of FIG. 12. The processor also calculates the deceleration start timing for causing the subject vehicle to stop at the target stop position (step S54). Then, when the start timing arrives, the processor sets the target deceleration to the deceleration G1 and decelerates the subject vehicle (step S54).

On the other hand, when the determination result in step S53 is positive, it means that the subject vehicle may be able to enter the intersection PI. Therefore, in this case, deceleration to the deceleration G3 (>G1) is immediately executed. Specifically, the processor sets a target stop position of the subject vehicle based on the various pieces of information acquired in step S4 of FIG. 12. Then, in order to cause the subject vehicle to stop at the target stop position, the processor also sets the target deceleration to the deceleration G3 and decelerates the subject vehicle (step S55). However, the example 3 described in FIG. 8 corresponds to a case where the process of step S54 or S55 is executed after the determination of step S53.

In a process of step S56, it is determined whether the predicted states PSs of all the vehicles composing the vehicle group MG are the state SUA. When the determination result in step S56 is positive, the process proceeds to step S54, and deceleration to the deceleration G1 is executed. However, the example 2 described in FIG. 7 corresponds to a case where the process of step S54 is executed after the determination of step S56.

On the other hand, when the determination result in step S56 is negative, it means that the predicted states PSs of all the vehicles composing the vehicle group MG are the state SAB1. Therefore, in this case, the control for setting the target speed of the subject vehicle to the current speed and maintaining the speed of the subject vehicle at the current speed is executed (step S58). However, the example 1 described in FIG. 6 corresponds to a case where the process of step S58 is executed after the determination of step S56.

When the determination result in step S52 is negative, it means that the predicted state PS of the subject vehicle is the state SAB1 or SAB2. For this reason, in order to specify the predicted state PS, in a process of step S57, it is determined whether the predicted state PS of the subject vehicle is the state SAB2. When the determination result in step S57 is positive, it means that the predicted state PS of the subject vehicle corresponds to the state SAB2. In this case, in order to cause the subject vehicle to enter the intersection PI, the temporary acceleration of the subject vehicle is executed (step S59). However, the example 4 described in FIG. 9 corresponds to a case where a process of step S59 is executed.

On the other hand, when the determination result in step S57 is negative, it means that the predicted state PS of the subject vehicle corresponds to the state SAB1. In this case, the process of step S58 is executed. In other words, the control for setting the target speed of the subject vehicle to the current speed and maintaining the speed of the subject vehicle at the current speed is executed.

3. Effect

With the first embodiment described above, the predicted state PS of each vehicle is calculated based on the various pieces of information acquired before the traveling regulation point, and the information of the predicted state PS is shared among the vehicle group MG. Then, using the shared information, the autonomous driving control of each vehicle is executed such that the operations of the vehicle group MG regarding the entry to the traveling regulation point are aligned. Therefore, it is possible to restrict the vehicle group MG from being separated at the traveling regulation point.

Second Embodiment

Next, a second embodiment will be described with reference to FIGS. 14 to 17. However, a configuration example of a control system according to the second embodiment is basically the same as that of the first embodiment. For this reason, the description of the configuration example will be omitted. In addition, the description the same as that of the first embodiment will also be omitted as appropriate.

1. Overview of Second Embodiment

Figure 14:
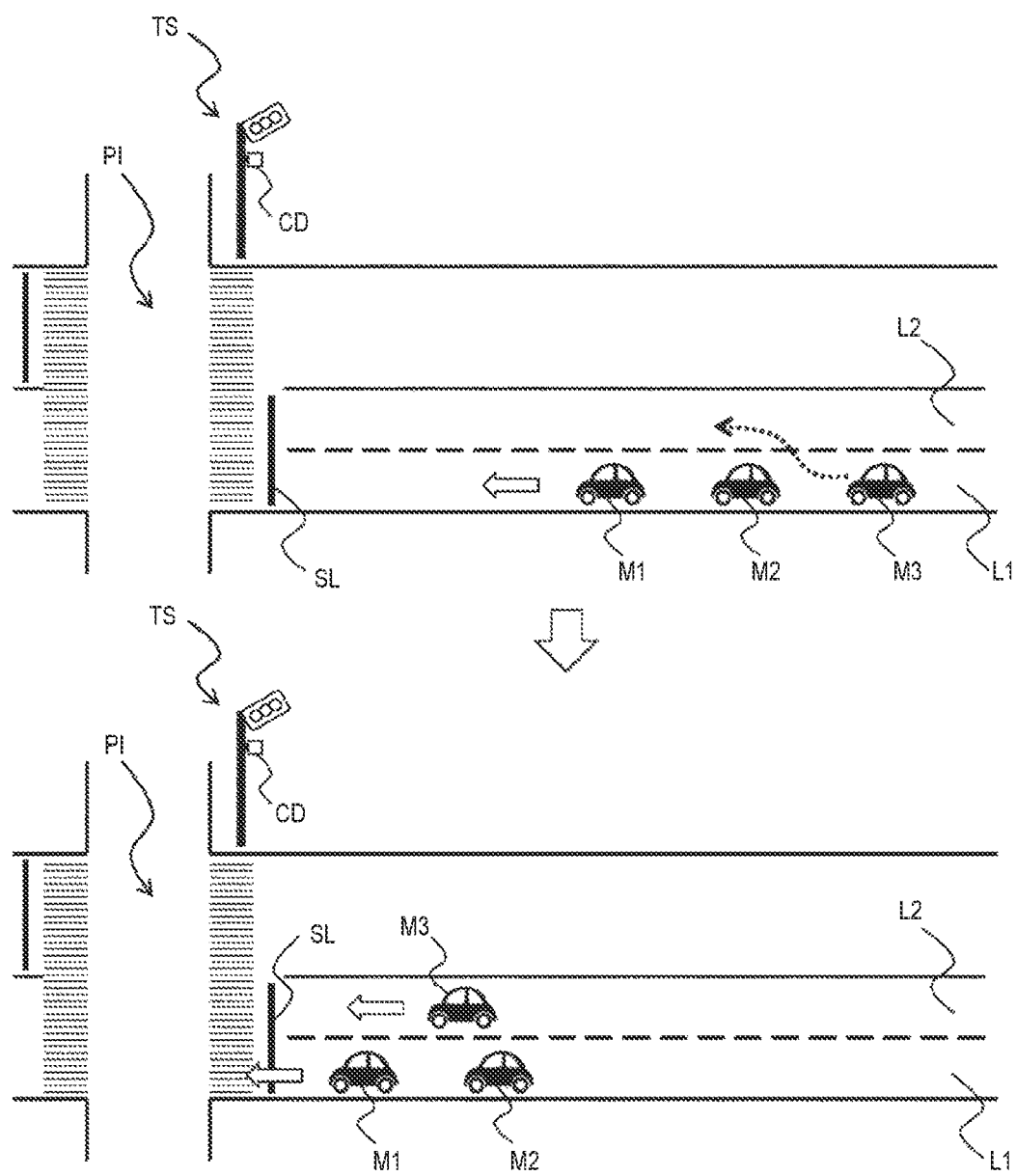
FIG. 14 is a diagram describing an overview of a second embodiment.

FIG. 14 is a diagram describing an overview of the second embodiment. On the upper part of FIG. 14, the vehicle group MG traveling in the same direction is depicted. The vehicle group MG is composed of vehicles M1 to M3. Up to this point, the description is the same as that of FIG. 1. Description different from that of FIG. 1 is that the lane LN in which the vehicle group MG can travel includes a lane L1 and a lane L2. For example, the lane L1 is a traveling lane and the lane L2 is an overtaking lane. In an example illustrated in FIG. 14, the vehicle group MG is traveling in the lane L1.

As described in the example 4 of FIG. 9, in the first embodiment, when the predicted states PSs of the vehicles M1, M2 are the "state SAB1" or the "state SAB2", and the predicted state PS of the vehicle M3 is "state SAB2", the autonomous driving control for causing each of vehicles M1 to M3 to temporarily accelerate is executed. On the other hand, in the second embodiment, the control device of vehicle M3 executes the autonomous driving control for changing the traveling lane of the subject vehicle from the lane L1 to the lane L2.

The lane change of the vehicle M3 is executed instead of the autonomous driving control for causing the vehicle M3 to temporarily accelerate. The lane change of the vehicle M3 is executed on, for example, a condition that there is no deceleration factor of the vehicle M3 in the lane L2. During the lane change of the vehicle M3, the vehicle M3 is caused to temporarily accelerate. As such, the vehicle M3 enters the intersection PI while traveling in parallel with the vehicle M1 or M2.

Figure 15:
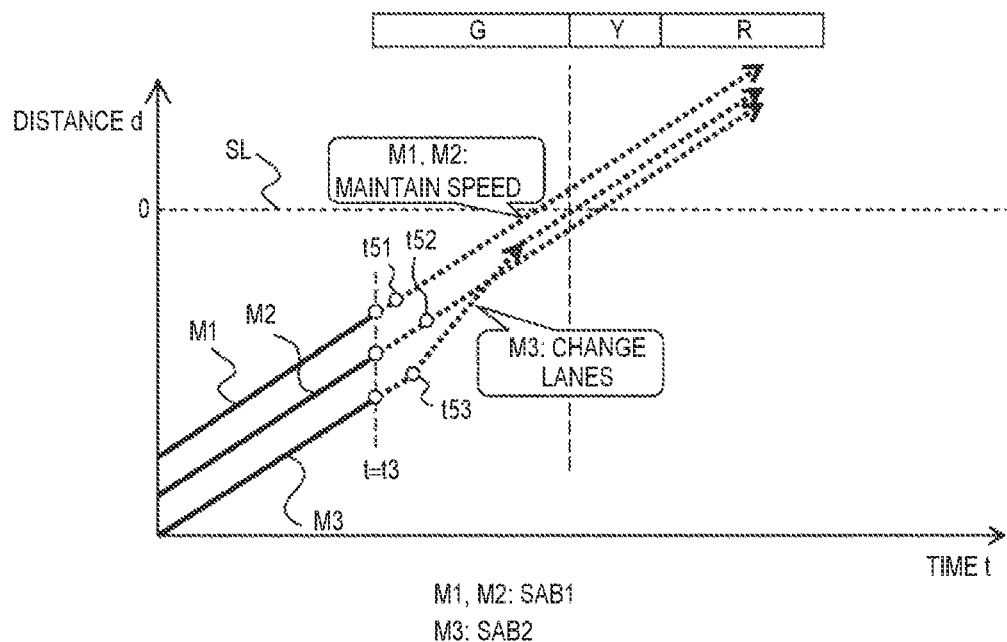
FIG. 15 is a graph describing an example 5 of the autonomous driving control before the intersection.

FIG. 15 is a graph describing an example 5 of the autonomous driving control before the intersection PI. In the example 5, the predicted states PS s of the vehicles M1, M2 are calculated to be the "state SAB1". On the other hand, the predicted state PS of the vehicle M3 is calculated to be the "state SAB2". In the example 5, the autonomous driving control for causing all the vehicles M1 to M3 to enter the intersection PI is executed. Specifically, each control device of the vehicles M1, M2 executes the autonomous driving control for maintaining the current speed of the subject vehicle. On the other hand, the control device of the vehicle M3 executes the autonomous driving control for changing the traveling lanes. The target acceleration during the lane change is set based on the current speed and the target speed.

Figure 16:
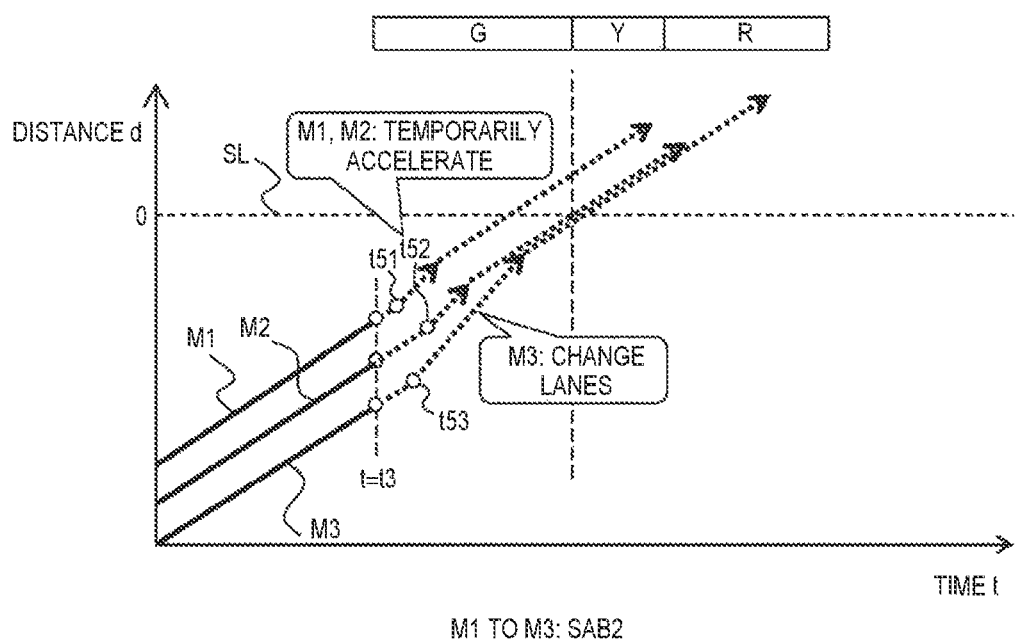
FIG. 16 is a graph describing an example 6 of the autonomous driving control before the intersection.

FIG. 16 is a graph describing an example 6 of the autonomous driving control before the intersection PI. In the example 6, the predicted states PSs of all the vehicles M1 to M3 are calculated to be the "state SAB2". In the example 6, different from the example 5 illustrated in FIG. 15, each control device of the vehicles M1, M2 executes the autonomous driving control for causing the subject vehicle to temporarily accelerate. The target acceleration during the autonomous driving control is set for each vehicle based on the current speed and the target speed. The point at which the control device of the vehicle M3 executes the autonomous driving control for changing the traveling lanes is the same as that of the example 5 illustrated in FIG. 15.

As already described, the calculation of the predicted state PS using the V2I communication is executed before the timing when the light color is changed from "G" to "Y". For this reason, considering the lane change of the vehicle M3 when the predicted state PS of the vehicle M3 corresponds to the "state SAB2" increases the number of options for causing the vehicle M3 to enter the intersection PI. Therefore, it is possible to suitably restrict the vehicle group MG from being separated by increasing a probability that all the vehicles of the vehicle group MG enter the intersection PI before the traffic signal TS is changed to the yellow light.

The lane change of the vehicle M3 can also be applied to the autonomous driving control of the vehicle M2. Further, the lane change of the vehicle M3 can also be applied to the autonomous driving control of the vehicle M1. As such, in the second embodiment, when the predicted states PSs of all the vehicles M1 to M3 are calculated to be the "state SAB2" and a condition for executing the lane change is satisfied, at least the lane change of the vehicle M3 is executed.

The autonomous driving control in the second embodiment is effective when there is a deceleration factor between the stop line SL and the vehicle M1. This is because, in the first embodiment, when there is a deceleration factor between the stop line SL and the vehicle M1, the autonomous driving control for causing the vehicles M1 to M3 to decelerate may be started after the start of temporary acceleration. In this regard, with the second embodiment, in a case where there is a deceleration factor in the lane L1 but there is no deceleration factor in the lane L2, it is possible to change lanes of the vehicles M1 to M3. Therefore, it is possible to cause all the vehicles M1 to M3 to enter the intersection PI before the traffic signal TS is changed to the yellow light.

2. Processing Example Associated with Autonomous Driving Control

Figure 17:
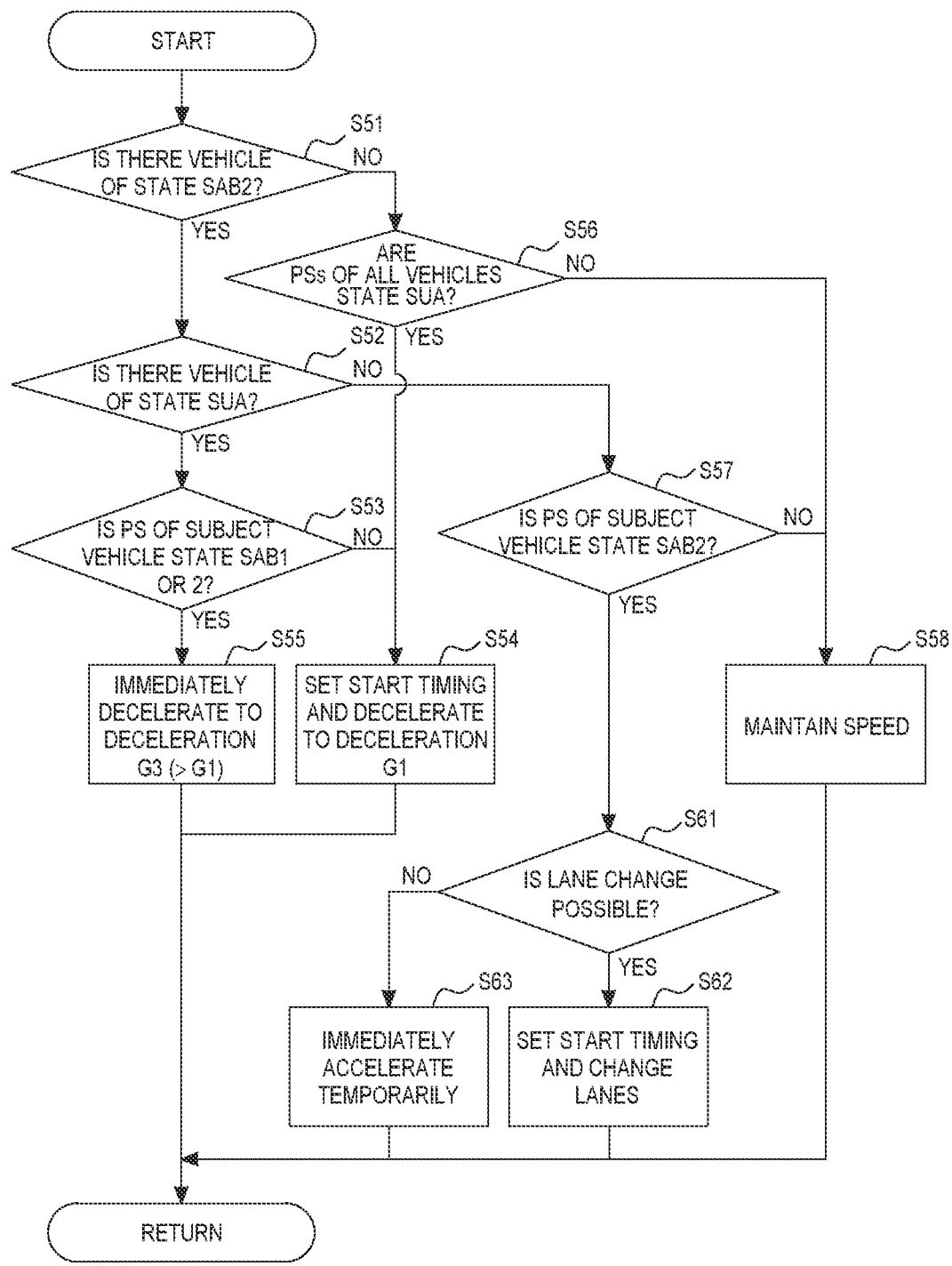
FIG. 17 is a flowchart describing a flow of processing executed by the control device of each vehicle when the predicted vehicle information is included in the vehicle-to-vehicle communication information.

FIG. 17 is a flowchart describing a flow of processing associated with the autonomous driving control executed by each control device (each processor) of the vehicles M1 to M3. The processing of the routine illustrated in FIG. 17 is executed instead of the processing of the routine illustrated in FIG. 13. In other words, the processing of the routine illustrated in FIG. 17 is executed when the V2V communication information includes the information of the predicted state PS in the process of step S5 illustrated in FIG. 12.

In the routine illustrated in FIG. 17, when the determination result in step S57 is positive, it is determined whether the lane change is possible (step S61). Whether the lane change is possible includes, for example, whether there is a lane adjacent to the lane in which the subject vehicle is currently traveling and whether there is a deceleration factor of the subject vehicle in the adjacent lane. Whether these conditions are satisfied is determined based on, for example, the external situation information.

When the determination result in step S61 is positive, the start timing of the lane change is calculated (step S62). Then, when the start timing arrives, the lane change of the subject vehicle is executed (step S62). The target acceleration during the lane change is set based on the current speed and the target speed. On the other hand, when the determination result of step S61 is negative, the temporary acceleration of the subject vehicle is executed so as to cause the subject vehicle to enter the intersection PI (step S63).

3. Effect

With the second embodiment described above, the following effect is obtained in addition to the effects of the first embodiment. In other words, when the predicted state PS corresponds to the "state SAB2", it is possible to consider the lane change of the subject vehicle. Therefore, the number of options for causing the vehicle of which the predicted state PS corresponds to the "state SAB2" to enter the traveling regulation point is increased. Therefore, it is possible to suitably restrict the vehicle group MG from being separated by increasing a probability that all the vehicle group MG enter the intersection PI before the traffic signal TS is changed to the yellow light.

What is claimed is:

1. A control system of a vehicle group traveling in a column, the control system comprising:
   each vehicle composing the vehicle group including a control device and a communication device, wherein:
   the control device of each vehicle includes a memory that stores various pieces of information and a processor that processes the various pieces of information;
   the various pieces of information include speed information of a subject vehicle, light color information of a traffic signal provided at a traveling regulation point in front of the vehicle group on a road on which the vehicle group travels in the column, and distance information between the subject vehicle and an entrance of the traveling regulation point;
   the processor of each control device is configured to:
      predict a vehicle state of the subject vehicle before the traveling regulation point based on the speed information of the subject vehicle, the light color information, and the distance information; and
      transmit the information on the predicted vehicle state to a vehicle, other than the subject vehicle, composing the vehicle group;
   the vehicle state includes:
      an unenterable state indicating a state where, when the traffic signal is changed from a green light to a yellow light, the traveling regulation point is unenterable;
      a first enterable state indicating a state where, when the traffic signal is changed from a green light to a yellow light, the traveling regulation point is enterable by maintaining speed of the subject vehicle at a start timing of the yellow light after the start timing; and
      a second enterable state indicating a state where, when the traffic signal is changed from a green light to a yellow light, the subject vehicle enters the traveling regulation point if deceleration of the subject vehicle is started at the start timing of the yellow light but the traveling regulation point is enterable if temporary acceleration of the subject vehicle is executed before the start timing; and
   the processor of each control device is further configured to:
      determine, based on the information on the predicted vehicle state, whether a vehicle of which the predicted vehicle state corresponds to the unenterable state is included in the vehicle group; and
      control, upon determining that the vehicle of which the predicted vehicle state corresponds to the unenterable state is included in the vehicle group, the subject vehicle such that the subject vehicle does not enter the traveling regulation point.

2. The control system according to claim 1, wherein the processor of each control device is further configured to, when the processor determines that the vehicle of which the predicted vehicle state corresponds to the unenterable state is included in the vehicle group and the predicted vehicle state of the subject vehicle corresponds to the first or the second enterable state, increase a target deceleration of the subject vehicle as compared to when the predicted vehicle state of the subject vehicle corresponds to the unenterable state.

3. A control system of a vehicle group traveling in a column, the control system comprising:
   each vehicle composing the vehicle group including a control device and a communication device, wherein:
   the control device of each vehicle includes a memory that stores various pieces of information and a processor that processes the various pieces of information;
   the various pieces of information include speed information of a subject vehicle, light color information of a traffic signal provided at a traveling regulation point in front of the vehicle group on a road on which the vehicle group travels in a column, and distance information between the subject vehicle and an entrance of the traveling regulation point;
   the processor of each control device is configured to:
      predict a vehicle state of the subject vehicle before the traveling regulation point based on the speed information of the subject vehicle, the light color information, and the distance information; and
      transmit the information on the predicted vehicle state to a vehicle, other than the subject vehicle, composing the vehicle group;

the vehicle state includes:
an unenterable state indicating a state where, when the traffic signal is changed from a green light to a yellow light, the traveling regulation point is unenterable;
a first enterable state indicating a state where, when the traffic signal is changed from a green light to a yellow light, the traveling regulation point is enterable by maintaining speed of the subject vehicle at a start timing of the yellow light after the start timing; and
a second enterable state indicating a state where, when the traffic signal is changed from a green light to a yellow light, the subject vehicle enters the traveling regulation point if deceleration of the subject vehicle is started at the start timing of the yellow light but the traveling regulation point is enterable if temporary acceleration of the subject vehicle is executed before the start timing; and
the processor of each control device is further configured to:
determine, based on the information on the predicted vehicle state, whether a vehicle of which the predicted vehicle state corresponds to the unenterable state is included in the vehicle group;
maintain, when the processor determines that the vehicle of which the predicted vehicle state corresponds to the unenterable state is not included in the vehicle group and the predicted vehicle state of the subject vehicle corresponds to the first enterable state, a target speed of the subject vehicle at a current speed; and
increase, when the processor determines that the vehicle of which the predicted vehicle state corresponds to the unenterable state is not included in the vehicle group and the predicted vehicle state of the subject vehicle corresponds to the second enterable state, the target speed of the subject vehicle to a speed higher than the current speed and lower than a permitted upper limit speed.

4. The control system according to claim 3, wherein the processor of each control device is configured to, upon determining that the vehicle of which the predicted vehicle state corresponds to the unenterable state is included in the vehicle group, control the subject vehicle such that the subject vehicle does not enter the traveling regulation point.

5. The control system according to claim 4, wherein the processor of each control device is further configured to, when the processor determines that the vehicle of which the predicted vehicle state corresponds to the unenterable state is included in the vehicle group and the predicted vehicle state of the subject vehicle corresponds to the first or the second enterable state, increase a target deceleration of the subject vehicle as compared with when the predicted vehicle state of the subject vehicle corresponds to the unenterable state.

6. A control system of a vehicle group traveling in a column, the control system comprising:
each vehicle composing the vehicle group including a control device and a communication device, wherein:
the control device of each vehicle includes a memory that stores various pieces of information and a processor that processes the various pieces of information;
the various pieces of information include speed information of a subject vehicle, external situation information of the subject vehicle, light color information of a traffic signal provided at the traveling regulation point in front of the vehicle group on a road on which the vehicle group travels in a column, and distance information between the subject vehicle and an entrance of the traveling regulation point;
the processor of each control device is configured to:
predict a vehicle state of the subject vehicle before the traveling regulation point based on the speed information of the subject vehicle, the light color information, and the distance information; and
transmit the information on the predicted vehicle state to a vehicle, other than the subject vehicle, composing the vehicle group;
the vehicle state includes:
an unenterable state indicating a state where, when the traffic signal is changed from a green light to a yellow light, the traveling regulation point is enterable;
a first enterable state indicating a state where, when the traffic signal is changed from a green light to a yellow light, the traveling regulation point is enterable by maintaining speed of the subject vehicle at a start timing of the yellow light after the start timing; and
a second enterable state indicating a state where, when the traffic signal is changed from a green light to a yellow light, the subject vehicle enters the traveling regulation point if deceleration of the subject vehicle is started at the start timing of the yellow light but the traveling regulation point is enterable if temporary acceleration of the subject vehicle is executed before the start timing; and
the processor of each control device is further configured to:
determine, based on the information on the predicted vehicle state, whether a vehicle of which the predicted vehicle state corresponds to the unenterable state is included in the vehicle group;
maintain, when the processor determines that the vehicle of which the predicted vehicle state corresponds to the unenterable state is not included in the vehicle group and the predicted vehicle state of the subject vehicle corresponds to the first enterable state, a target speed of the subject vehicle at a current speed;
determine, when the processor determines that the vehicle of which the predicted vehicle state corresponds to the unenterable state is not included in the vehicle group and the predicted vehicle state of the subject vehicle corresponds to the second enterable state, whether a lane change from a first lane in which the vehicle group is traveling in a column to a second lane adjacent to the first lane is executable by the subject vehicle, based on the external situation information of the subject vehicle;
execute, upon determining that the lane change is executable by the subject vehicle, the lane change; and
increase, upon determining that the lane change is not executable by the subject vehicle, the target speed of the subject vehicle to a speed higher than the current speed and lower than a permitted upper limit speed.

7. A control method of a vehicle group by a control device of each vehicle composing the vehicle group, the control method comprising:
predicting a vehicle state of a subject vehicle indicating a vehicle on which the control device is mounted before a traveling regulation point based on speed information of the subject vehicle, light color information of a traffic signal provided at a traveling regulation point in front of the vehicle group on a road on which the vehicle group travels in a column, and distance information between the subject vehicle and an entrance of the traveling regulation point; and transmitting the information on the predicted vehicle state to a vehicle, other than the subject vehicle, composing the vehicle group, wherein:

the vehicle state includes:

an unenterable state indicating a state where, when the traffic signal is changed from a green light to a yellow light, the traveling regulation point is unenterable;

a first enterable state indicating a state where, when the traffic signal is changed from a green light to a yellow light, the traveling regulation point is enterable by maintaining speed of the subject vehicle at a start timing of the yellow light after the start timing; and a second enterable state indicating a state where, when the traffic signal is changed from a green light to a yellow light, the subject vehicle enters the traveling regulation point if deceleration of the subject vehicle is started at the start timing of the yellow light but the traveling regulation point is enterable if temporary acceleration of the subject vehicle is executed before the start timing; and the control method further includes:

determining, based on the information on the predicted vehicle state, whether a vehicle of which the predicted vehicle state corresponds to the unenterable state is included in the vehicle group; and controlling, upon determining that the vehicle of which the predicted vehicle state corresponds to the unenterable state is included in the vehicle group, the subject vehicle such that the subject vehicle does not enter the traveling regulation point.

8. A control method of a vehicle group by a control device of each vehicle composing the vehicle group, the control method comprising:

predicting a vehicle state of a subject vehicle indicating a vehicle on which the control device is mounted before a traveling regulation point based on speed information of the subject vehicle, light color information of a traffic signal provided at a traveling regulation point in front of the vehicle group on a road on which the vehicle group travels in a column, and distance information between the subject vehicle and an entrance of the traveling regulation point; and transmitting the information on the predicted vehicle state to a vehicle, other than the subject vehicle, composing the vehicle group, wherein the vehicle state includes:

an unenterable state indicating a state where, when the traffic signal is changed from a green light to a yellow light, the traveling regulation point is unenterable;

a first enterable state indicating a state where, when the traffic signal is changed from a green light to a yellow light, the traveling regulation point is enterable by maintaining the speed of the subject vehicle at a start timing of the yellow light after the start timing; and a second enterable state indicating a state where, when the traffic signal is changed from a green light to a yellow light, the subject vehicle enters the traveling regulation point if deceleration of the subject vehicle is started at the start timing of the yellow light but the traveling regulation point is enterable if temporary acceleration of the subject vehicle is executed before the start timing; and the control method further includes:

determining, based on the information on the predicted vehicle state, whether a vehicle of which the predicted vehicle state corresponds to the unenterable state is included in the vehicle group;

maintaining, when the control device determines that the vehicle of which the predicted vehicle state corresponds to the unenterable state is not included in the vehicle group and the predicted vehicle state of the subject vehicle corresponds to the first enterable state, a target speed of the subject vehicle at a current speed; and increasing, when the control device determines that the vehicle of which the predicted vehicle state corresponds to the unenterable state is not included in the vehicle group and the predicted vehicle state of the subject vehicle corresponds to the second enterable state, the target speed of the subject vehicle to a speed higher than the current speed and lower than a permitted upper limit speed.

9. A control method of a vehicle group by a control device of each vehicle composing the vehicle group, the control method comprising:

predicting a vehicle state of a subject vehicle indicating a vehicle on which the control device is mounted before a traveling regulation point based on speed information of the subject vehicle, external situation information of the subject vehicle, light color information of a traffic signal provided at a traveling regulation point in front of the vehicle group on a road on which the vehicle group travels in a column, and distance information between the subject vehicle and an entrance of the traveling regulation point; and transmitting the information on the predicted vehicle state to a vehicle, other than the subject vehicle, composing the vehicle group, wherein the vehicle state includes:

an unenterable state indicating a state where, when the traffic signal is changed from a green light to a yellow light, the traveling regulation point is unenterable;

a first enterable state indicating a state where, when the traffic signal is changed from a green light to a yellow light, the traveling regulation point is enterable by maintaining speed of the subject vehicle at a start timing of the yellow light after the start timing; and a second enterable state indicating a state where, when the traffic signal is changed from a green light to a yellow light, the subject vehicle enters the traveling regulation point if deceleration of the subject vehicle is started at the start timing of the yellow light but the traveling regulation point is enterable if temporary acceleration of the subject vehicle is executed before the start timing; and the control method further includes:

determining, based on the information on the predicted vehicle state, whether a vehicle of which the predicted vehicle state corresponds to the unenterable state is included in the vehicle group;

maintaining, when the control device determines that the vehicle of which the predicted vehicle state corresponds to the unenterable state is not included in the vehicle group and the predicted vehicle state of the subject vehicle corresponds to the first enterable state, a target speed of the subject vehicle at a current speed;

determining, when the control device determines that the vehicle of which the predicted vehicle state corresponds to the unenterable state is not included in the vehicle group and the predicted vehicle state of the subject vehicle corresponds to the second enterable state, whether a lane change from a first lane in which the vehicle group is traveling in a column to a second lane adjacent to the first lane is executable by the subject vehicle, based on the external situation information of the subject vehicle;

executing, upon determining that the lane change is executable by the subject vehicle, the lane change; and increasing, upon determining that the lane change is executable by the subject vehicle, the target speed of the subject vehicle to a speed higher than the current speed and lower than a permitted upper limit speed.

\* \* \* \* \*